(12) United States Patent
Hansen et al.

(10) Patent No.: US 11,852,729 B2
(45) Date of Patent: *Dec. 26, 2023

(54) GROUND INTENSITY LIDAR LOCALIZER

(71) Applicant: UATC, LLC, San Francisco, CA (US)

(72) Inventors: Peter Hansen, Pittsburgh, PA (US); Hatem Alismail, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/046,789

(22) Filed: Oct. 14, 2022

(65) Prior Publication Data

US 2023/0071784 A1 Mar. 9, 2023

Related U.S. Application Data

(63) Continuation of application No. 16/536,895, filed on Aug. 9, 2019, now Pat. No. 11,493,635.

(Continued)

(51) Int. Cl.
*G01S 17/89* (2020.01)
*G01S 7/48* (2006.01)
(Continued)

(52) U.S. Cl.
CPC .......... *G01S 17/89* (2013.01); *G01S 7/4808* (2013.01); *G01S 17/08* (2013.01); *G01S 17/88* (2013.01);
(Continued)

(58) Field of Classification Search
CPC ........ G01S 17/89; G01S 7/4808; G01S 17/08; G01S 17/88; G01S 17/894; G01S 17/931;
(Continued)

(56) References Cited

U.S. PATENT DOCUMENTS 9,875,557 B2 * 1/2018 Napier .................. G06T 5/002
10,627,512 B1 * 4/2020 Hicks ........................ G06T 5/50
(Continued)

OTHER PUBLICATIONS

"U.S. Appl. No. 16/536,895, Notice of Allowance dated Jul. 5, 2022", 11 pgs.

(Continued)

*Primary Examiner* — Muhammad Shafi
(74) *Attorney, Agent, or Firm* — SCHWEGMAN LUNDBERG & WOESSNER, P.A.

(57) ABSTRACT

A system for determining a pose of a vehicle and building maps from vehicle priors processes received ground intensity LIDAR data including intensity data for points believed to be on the ground and height information to form ground intensity LIDAR (GIL) images including pixels in 2D coordinates where each pixel contains an intensity value, a height value, and x- and y-gradients of intensity and height. The GIL images are formed by filtering aggregated ground intensity LIDAR data falling into a same spatial bin on the ground and using a registration algorithm to align two GIL images relative to one another by estimating a 6-degree-of-freedom pose with associated uncertainty that minimizes error between the two GIL images. The aligned GIL images are provided as a pose estimate to a localizer. The system may provide online localization and pose estimation, prior building, and prior to prior alignment pose estimation using image-based techniques.

20 Claims, 11 Drawing Sheets

Related U.S. Application Data

(60) Provisional application No. 62/835,207, filed on Apr. 17, 2019.

(51) Int. Cl.

| | | |
|---|---|---|
| *G01S 17/08* | (2006.01) | |
| *G01S 17/931* | (2020.01) | |
| *G01S 17/88* | (2006.01) | |
| *G01S 17/894* | (2020.01) | |
| *G05D 1/00* | (2006.01) | |
| *G05D 1/02* | (2020.01) | |
| *G06T 7/73* | (2017.01) | |

(52) U.S. Cl.
CPC .......... *G01S 17/894* (2020.01); *G01S 17/931* (2020.01); *G05D 1/0033* (2013.01); *G05D 1/021* (2013.01); *G05D 1/0212* (2013.01); *G05D 1/0219* (2013.01); *G05D 1/0231* (2013.01); *G06T 7/74* (2017.01)

(58) Field of Classification Search
CPC .... G05D 1/0033; G05D 1/021; G05D 1/0212; G05D 1/0219; G05D 1/0231; G06T 7/74
USPC ........................................................ 356/4.01
See application file for complete search history.

(56) References Cited

U.S. PATENT DOCUMENTS

| | | | | |
|---|---|---|---|---|
| 2017/0200273 | A1* | 7/2017 | Kamilov | H04N 5/2258 |
| 2019/0266779 | A1* | 8/2019 | Kulkarni | G06T 7/30 |
| 2019/0385025 | A1* | 12/2019 | McMichael | G06V 10/82 |
| 2019/0387185 | A1* | 12/2019 | Hicks | H04N 5/33 |
| 2020/0103920 | A1* | 4/2020 | Castorena Martinez | G08G 1/166 |
| 2020/0333466 | A1 | 10/2020 | Hansen et al. | |

OTHER PUBLICATIONS

Barsan, et al., "Learning to localize using a lidar intensity map", In Conference on Robot Learning, (Oct. 2018), 605-616.

Castorena, Juan, et al., "Ground-Edge-Based LIDAR Localization Without a Reflectivity Calibration for Autonomous Driving", IEEE Robotics and Automation Letters, vol. 3(1), (2018), 344-351.

Levinson, Jesse, et al., "Robust vehicle localization in urban environments using probabilistic maps", Robotics and Automation (ICRA), 2010 IEEE International Conference on. IEEE, (2010), 4372-4378.

Levinson, Jesse, et al., "Towards fully autonomous driving: Systems and algorithms", 2011 IEEE Intelligent Vehicles Symposium (IV) Baden-Baden, Germany,, (Jun. 2011), 6 pgs.

Sivaraman, Sayanan, et al., "Looking at vehicles on the road: A survey of vision-based vehicle detection, tracking, and behavior analysis", IEEE Transactions on Intelligent Transportation Systems, vol. 14, No. 4, (Dec. 2013), 23 pgs.

Wan, Guowei, et al., "Robust and precise vehicle localization based on multi-sensor fusion in diverse city scenes", IEEE International Conference on Robotics and Automation, (2018), 4670-4677.

Wolcott, Ryan W, et al., "Robust LIDAR localization using multiresolution Gaussian mixture maps for autonomous driving", The International Journal of Robotics Research, 36(3), (2017), 292-319.

* cited by examiner

GROUND INTENSITY LIDAR LOCALIZER

CROSS-REFERENCE TO RELATED APPLICATIONS

This application is a continuation of and claims the benefit of priority of U.S. application Ser. No. 16/536,895, filed Aug. 9, 2019, which is now issued as U.S. Pat. No. 11,493,635 and claims the benefit of priority of U.S. Provisional Patent Application Ser. No. 62/835,207, filed Apr. 17, 2019, the contents of each of which are hereby incorporated by reference for all purposes.

TECHNICAL FIELD

The disclosure herein is directed to a ground intensity light detection and ranging (LIDAR) localizer that complements a conventional LIDAR localizer, particularly in environments with insufficient geometric constraints such as long stretches of highways, bridges, and tunnels.

BACKGROUND

Autonomous vehicle technology typically relies on the fusion of sensor data to enable a computational control system of the autonomous vehicle to perform perception, prediction, motion planning, and vehicle control operations. A key aspect to autonomous vehicle systems is the continuous determination of the autonomous vehicle's state, which can include the vehicle's position, orientation, trajectory, velocity, etc. with respect to the world around it (e.g., in a common and/or local reference frame). These operations are referred to as localization operations, or the determination of the vehicle's pose. Various methods of localization require the use of a sensor suite, which can comprise any number and type of sensors, such as radar, LIDAR, cameras, sonar, infrared, satellite positioning systems, and inertial measurement unit sensors. Accurate localization can also be aided by preconstructed localization maps that contain detailed prior data of a geographical region in which the autonomous vehicle operates.

The localization system provides accurate pose estimates in both continuous and map-relative frames. In order to generate map-relative estimates, the system matches current sensor readings against a prior map. Conventional systems are based on a geometric representation of the world generated from LIDAR measurements. However, in some areas of the operating environment, there is insufficient geometry to produce a reasonable map-relative estimate based on geometry alone. Areas with insufficient geometry are generally referred to as "geometrically degenerate." In geometrically generate areas, the system generally cannot guarantee good poses because there is not a diversity of geometric features for the algorithms to converge on with a unique solution. For example, the algorithms can come up with multiple answers that they think are all equally valid (similar error). Areas that have been found to be geometrically degenerate include some tunnels, bridges, highways, and some places within urban environments. With conventional geometric localization systems, these areas may be considered "out of scope."

The potential of incorporating LIDAR reflectance/intensity in a localization and mapping system has been recognized in the prior art. Among the first uses of LIDAR intensity in localization and mapping is the work described by Levinson et al. in "Towards fully autonomous driving: Systems and algorithms," *In Intelligent Vehicles Symposium (IV)*, June 2011 IEEE (pp. 163-168); Levinson et al in "Robust vehicle localization in urban environments using probabilistic maps," In *Robotics and Automation (ICRA)*, May 2010 IEEE International Conference on (pp. 4372-4378); and Sivaraman et al in "Looking at vehicles on the road: A survey of vision-based vehicle detection, tracking, and behavior analysis," IEEE Transactions on Intelligent Transportation Systems, 14(4), 1773-1795 (2013). The mapping process described in these works requires pre-calibrated and known vehicle poses, but the map is stored as an unorganized structure. The online localization approach by Levinson et al performs pose estimation using a histogram filter and is only concerned with 3-degrees-of-freedom localization. A related 3-degrees-of-freedom approach is described by Wolcott and Eustice in "Robust LIDAR localization using multiresolution Gaussian mixture maps for autonomous driving," *The International Journal of Robotics Research*, 36(3), 292-319 (2017), where the LIDAR intensity map is represented as a grid of Gaussian mixture models (GMM) such that vehicle localization may be determined by maximizing the likelihood of the live scan from the GMM. The registration process is performed via exhaustive search and relies on a GPU to achieve acceptable runtime.

Other approaches make use of the LIDAR intensity differently. For instance, Castorena and Agarwal in "Ground-Edge-Based LIDAR Localization Without a Reflectivity Calibration for Autonomous Driving," *IEEE Robotics and Automation Letters*, Vol. 3(1), 344-351 (2018), propose intensity-based localization using edges extracted from a LIDAR intensity map. The map construction stage of the work makes use of image-based techniques but restricts intensities to high reflectivity candidates that are expected to produce strong edges. The authors also propose the use of Normalized Mutual Information as the registration method of choice, which is a metric known to work robustly with multi-modal information. However, maximizing the mutual information requires an expensive optimization procedure. Also, the localization system of Castorena and Agarwal is limited to 3-degrees-of-freedom.

More recently, Barsan et al in "Learning to localize using a lidar intensity map," *In Conference on Robot Learning*, pp. 605-616 (October, 2018), relied upon machine learning techniques to learn a calibration-invariant representation of LIDAR intensity values that could be matched robustly to a pre-built map. This representation is obtained via deep learning method requiring a substantial amount of data. However, Barsan et. al.'s algorithm performs only 3-degrees-of-freedom localization and the online registration procedure is akin to an exhaustive search that maximizes the cross-correlation between the learned appearance-invariant representations from the live LIDAR data and the prior map.

Finally, Wan et al in "Robust and precise vehicle localization based on multi-sensor fusion in diverse city scenes," 2018 *IEEE International Conference on Robotics and Automation*, (ICRA) pp. 4670-4677, show a map construction that, in addition to storing intensity and height, further summarizes the information in each cell by a Gaussian Mixture Model. Online localization with intensity is performed with gradient-based optimization but is limited to 3-degrees-of-freedom estimation. More precisely, the in-plane vehicle translation (x- and y-directions) is performed with a gradient-based optimization approach but attitude determination is performed via an exhaustive search step, which can be quite expensive. The height information is not tightly coupled with intensity contributions in the estimation problem. Instead, each degree-of-freedom estimation step is performed independently. In particular, Wan et al use a histogram filter when making use of the height constraints in every pixel of the map.

Improved techniques for capturing localization data in geometrically generate areas are desired.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

FIG. 6A illustrates the constructed intensity image.

FIG. 6B illustrates the constructed height image.

FIG. 6C illustrates the intensity gradient along the x-direction.

FIG. 6D illustrates the height gradient along the x-direction.

FIG. 6E illustrates the intensity gradient along the y-direction.

FIG. 6F illustrates the height gradient along the y-direction.

FIG. 8A illustrates a single sweep of LIDAR with intensity data, which is relatively sparse.

FIG. 8B illustrates multiple LIDAR sweeps accumulated over a short period of time and travel distance to provide a more robust intensity reference map.

FIG. 8C illustrates an example of a prior build from all LIDAR data where the prior is sufficiently dense with good coverage of the target area.

FIG. 8D illustrates the same area in FIG. 8C but built with intensity data only.

DETAILED DESCRIPTION

Figure 1:
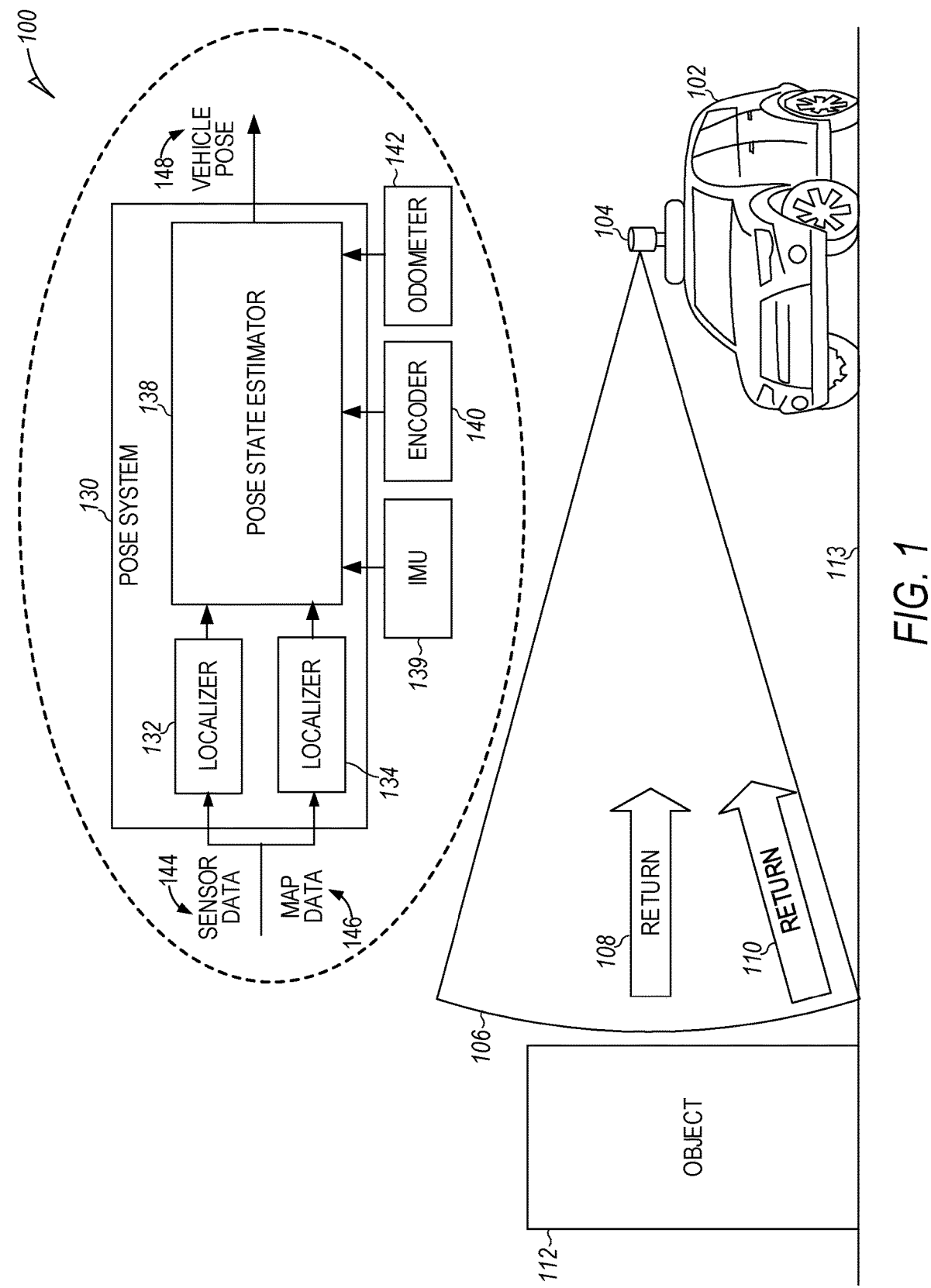
FIG. 1 is a diagram showing one example of an environment including a vehicle having a pose system.

It should be understood at the outset that although an illustrative implementation of one or more embodiments are provided below, the disclosed systems and/or methods described with respect to FIGS. 1-11 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Overview

As described herein, an autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information. In an autonomous or semi-autonomous vehicle, an autonomous vehicle (AV) control system controls one or more of the braking, steering, or throttle of the vehicle. In a fully-autonomous vehicle, the AV control system assumes full control of the vehicle. In a semi-autonomous vehicle, the AV control system assumes a portion of the vehicle control, with a human user (e.g., a vehicle operator) still providing some control input.

In order to navigate its surrounding environment, an autonomous vehicle (AV) can include a perception sensor system generating sensor data used to build a sensor view of the environment. The perception sensor system can include any number of cameras (e.g., stereoscopic or monocular cameras), LIDAR sensors, sonar sensors, infrared sensors, radar, inertial measurement units (IMU), encoders (e.g., wheel speed encoders), and/or other types of proximity or imaging sensors. The control system can comprise one or more processors executing an instruction set that causes the control system to process a sensor view generated by the perception sensor system to perform object detection operations and autonomously operate the vehicle's acceleration, braking, and steering systems. In addition, the sensor data generated from the various AV sensors can be logged and uploaded to an AV management system.

To aid in navigating the environment, autonomous vehicles can also rely on preconstructed localization maps that contain detailed prior data. For example, the localization maps can encompass long stretches of highways, city road segments, and the like. In order to create and update these localization maps, the AV management system can use the sensor data that are collected and stored by a fleet of autonomous vehicles and/or human-driven vehicles. Accordingly, the map creation process takes sensor logs, or mapping logs, captured in a target geographic region as input. However, these logs should first be imbued with accurate and consistent trajectories so that the map creation process can subsequently produce the geometric models to which lanes, intersections, and other autonomy relevant map entities are registered. The map creation process generates new map geometry by identifying the time intervals of sensor logs for a region, registering the associated environment geometry data (e.g., LIDAR points) into a common coordinate frame, and generating a geometric model of the world in that region.

In sample embodiments described herein, in order to enable localization of the geometrically degenerate areas, as well as to improve robustness in the localization system, a new localizer is provided that will use the intensity signal from LIDAR returns on the ground. The LIDAR intensity information from the ground is used to complement the geometric information obtained by conventional LIDAR systems by producing pose estimates based on the reflectivity of materials in the scene. In sample embodiments, both the geometric and the intensity LIDAR localization systems will run simultaneously (asynchronously), although each localization system may be used separately, alone, or together. For example, the intensity LIDAR localization system may be preferred in tunnels and other geometrically degenerate landscapes while the conventional LIDAR localization system may be otherwise used. Thus, a new intensity layer is added to existing maps. The pose filter will fuse the map-relative pose estimates generated by both the intensity localizer and the existing geometric localizer, thus extending the areas where the localization system can operate (since the failure modes of the different localizers are not identical).

To implement the ground intensity LIDAR localizer described herein, the localization stack is updated to allow for multiple localizers and multiple global pose implementations to run asynchronously in parallel and to provide pose estimates to the pose filter. In sample embodiments, a ground intensity LIDAR localizer uses the ground intensity LIDAR returns to estimate pose. The ground intensity LIDAR localizer runs in real-time with a comparable accuracy to conventional geometric localizers. The map build pipeline may, in turn, be upgraded to handle geometrically degenerate areas by incorporating ground intensity LIDAR into the map alignment tools.

The resulting system enables map alignment algorithms to be applied to geometrically degenerate areas and to improve reliability in other areas added to a map build pipeline. Also, maps & localization may be generalized to geometrically degenerate highway areas and to geometrically degenerate tunnels and bridges for trucks and cars to provide increased robustness in the localization system.

As described herein, the vehicle's localization systems make use of the LIDAR intensity data in at least three ways:
1—Online localization and pose estimation where the input includes a sparse LIDAR point cloud subsampled to retain points believed to be on the ground and the output includes the 6-degrees-of-freedom pose of the vehicle with respect to the prior.
2—Building priors using one or more data collection logs where the input includes LIDAR data with pose and the output includes a semi-dense image representation of the ground points' height (and uncertainty estimate) and intensity (and uncertainty estimate).
3—Prior to prior alignment pose estimation using image-based techniques for map builds where the input includes two image representations of the ground points where the priors may be significantly sparser than the ones used for online vehicle localization and the output includes a transformation that aligns one of the priors to the other.

In sample embodiments, an online localization system is provided for determining a pose of a vehicle that includes a processor that processes instructions to perform steps including receiving ground intensity LIDAR data including intensity data for points believed to be on the ground and height information (and optionally an initial estimate of the vehicle pose parameters) and forming ground intensity LIDAR (GIL) images including pixels in 2D coordinates where each pixel contains an intensity value, a height value, and x- and y-gradients of intensity and height by filtering aggregated ground intensity LIDAR data falling into a same spatial bin on the ground. Two GIL images are processed using a registration algorithm to align the two GIL images relative to one another by estimating a 6-degree-of-freedom pose with associated uncertainty that minimizes error between the two GIL images. The aligned GIL images are provided to a pose estimation module as a pose estimate. The registration algorithm may include a Gauss-Newton framework or a Levenberg-Marquardt framework that solves a nonlinear optimization problem to generate the 6-degree-of-freedom pose.

In the sample embodiments, the online localization system receives the ground intensity LIDAR data in the form of a 3D point cloud including intensity values and uncertainty estimates and receives a pose initialization estimate and combines the 3D point cloud and pose initialization estimate. The pose initialization estimate is further used to compensate for vehicle motion by transforming each LIDAR point with the pose initialization estimate to bring the LIDAR points into a consistent coordinate system. The transformed LIDAR points are stored in a rolling buffer that accumulates LIDAR points over a period of time. The LIDAR points are spatially filtered to retain only points within a certain radius from the vehicle using a range estimate of each LIDAR point and are downselected to identify those LIDAR points in the rolling buffer believed to be on the ground surface.

In sample embodiments, the downselecting includes discretizing a ground plane into partially overlapping cells having a specified size and, for each cell, determining which LIDAR points are candidates to be classified as ground points in said each cell by choosing points with height estimates closest to an expected ground height within a specified LIDAR range. Then, for every candidate ground point, a plane fitting is performed to determine which LIDAR points belong to the ground plane within a threshold. The candidate ground points including corresponding intensity values and height values within the threshold are assigned to a corresponding cell in an XY cell grid position in the ground plane. The candidate ground points are retained that fit into the ground plane with a normal pointing predominantly along the z-axis when the candidate ground points satisfy a minimum number of inliers per cell.

In other sample embodiments, processing the two GIL images to align the two GIL images relative to one another includes registering the assigned ground points with a 2.5D image prior including pixels that encode height from the ground and intensity return using a registration algorithm including at least one of a Gauss-Newton framework and a Levenberg-Marquardt framework to generate the 6-degree-of-freedom pose. In other sample embodiments, processing the two GIL images to align the two GIL images relative to one another includes aligning the two GIL images in scale-space. Also, for processing efficiency, points with vanishing reflectance or vanishing height gradients may be removed prior to processing the two GIL images for alignment. Alternatively, aligning the two GIL images relative to one another may include performing Inverse Compositional alignment of the two GIL images.

In other sample embodiments, a system for building priors includes receiving ground intensity LIDAR data including intensity data for points believed to be on the ground and height information and constructing a vehicle prior by discretizing a ground plane into partially overlapping cells having a specified size, determining ground points using LIDAR points having known positions as obtained during a map build, and for each ground point, performing a plane fitting to determine which LIDAR points belong to the ground plane within a threshold. The ground intensity LIDAR data is aggregated and filtered to determine a single height and intensity value per cell and a single intensity and height value is assigned to each XY cell grid position in the ground plane using an uncertainty weighted mean. A final prior image is then determined that encompasses the pixels in the XY cell grid positions in the ground plane. The final prior image may be stored as a 2.5D height-intensity image for deployment to the vehicle.

In the sample embodiments, constructing the vehicle prior may include spatially filtering the LIDAR points to retain only points within a certain radius from the vehicle using a range estimate of each LIDAR point and downselecting only points in the rolling buffer believed to be on the ground surface. Also, determining a single height and intensity value per cell may include calculating a weighted average or median of all intensity and height data falling into each XY cell grid position in the ground plane where weights for each LIDAR point are based on each LIDAR point's range and intensity estimated uncertainties. In the sample embodiments, statistical outlier LIDAR points may be removed on a per pixel basis and any holes in the LIDAR data may be filled by Gaussian smoothing using intensity values from neighboring pixels in the LIDAR data.

In other sample embodiments, a system provides prior to prior alignment by estimating a pose of a vehicle using two map-build priors using template matching. The system combines first and second map-build priors and determines an initial estimate of uv pixel shifts of the combined map-build priors by maximizing a Zero-Mean Normalized Cross Correlation. The initial estimate of the uv pixel shift is converted into an XY shift in meters and applied to ground points determined from ground intensity LIDAR data including intensity data for points believed to be on the ground and height information. A robust least squares algorithm is used to determine a z-axis translation and the XY shifted ground points and z-axis translation are provided to a pose estimation module for generating a 6-degrees-of-freedom estimate of the pose of the vehicle. Alternatively, initial estimates from the Zero-Mean Normalized Cross Correlation and an output of the robust least squares algorithm for a scale axis may be combined and provided to the pose estimation module.

In other sample embodiments, the system may provide prior to prior alignment pose estimation by constructing multiple map-build priors from the ground intensity LIDAR data on the fly and co-registering the multiple map-build priors by combining respective map-build priors, determining the initial estimate of uv pixel shifts of the combined respective map-build priors by maximizing the Zero-Mean Normalized Cross Correlation, converting the initial estimate of the uv pixel shift into the XY shift in meters, applying the XY shift to the ground points, using the robust least squares algorithm to determine the z-axis translation, and providing the XY shifted ground points and z-axis translation to the pose estimation module for generating the 6-degrees-of-freedom estimate of the pose of the vehicle.

These and other features will be apparent from the following detailed description.

Definitions

Numerous examples are referenced herein in context of autonomous vehicles. The term "autonomous vehicle" refers to a vehicle that is operated in a state of automation with respect to at least steering and propulsion. Different levels of autonomy may exist with respect to autonomous vehicles. For example, some vehicles may enable automation in limited scenarios, such as on highways, provided that a safety driver is present in the vehicle. More advanced autonomous vehicles can drive without any human assistance from within or external to the vehicle.

A "geographic region" can refer to any physical area accessible by vehicle and its surrounding environment, including road segments, combinations of road segments, neighborhoods, cities, etc.

A "map-relative pose estimate" is a pose estimate in a map-relative frame that includes a submap ID, 6 degree-of-freedom pose estimate in the frame of that submap, and a covariance matrix representing the uncertainty of the estimate.

A "localizer" is a component of the localization stack that receives sensor data and an initial guess and generates a map-relative pose estimate by registering observed data against the map given the initial guess. The localizer provides estimates of the vehicle's 6-degrees-of-freedom position and orientation (pose), velocities, accelerations and associated uncertainties and frame-to-frame transformations as required by the vehicle's motion planning, control, perception, and other subsystems. The localizer notifies the pose filter if the system should transition to a new frame (submap) and how to get to the new frame.

"Geometrically degenerate" is a term used to describe an environment in which there is insufficient 3D information for the geometry-based localizer to converge to a unique solution near the initial guess. Quantitatively, this can be measured by the distribution of surface normals in the map within the sensor range (surface normals should span $R^3$).

A "pose filter" is a component of the localization stack that runs a set of Extended Kalman Filters to fuse information from sensors (e.g., IMU, encoders) and pose estimates from localizers to estimate and publish map-relative and continuous pose.

A "global pose" is a component of the localization stack responsible for providing bootstrapping estimates when the system's map-relative pose is uninitialized/invalid.

"Ground Intensity Lidar" (GIL) refers to the concept of using a representation of the ground derived from LIDAR intensity information where the LIDAR data includes height and intensity information on a ground plane.

"6-degrees-of-freedom" refers to the movement of a rigid body in three-dimensional space including forward/backward, up/down, left right combined with pitch, yaw, and roll.

One or more aspects described herein provide that methods, techniques and actions performed by a computing device are performed programmatically or as a computer-implemented method. Programmatically means through the use of code or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs, or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid-state memory (such as carried on many cell phones and consumer electronic devices), and magnetic memory. Computers, terminals, network-enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog or VHDL. These languages contain instructions that ultimately define the layout of the circuit. However, once the circuit is fabricated, there are no instructions, and the processing is performed by interconnected gates.

Sample Embodiments

Autonomous Vehicle

FIG. 1 is a diagram showing one example of an environment 100 including a vehicle 102 having a pose system 130. The vehicle 102, in some examples, is a self-driving vehicle (SDV) or autonomous vehicle (AV) comprising a vehicle autonomy system (FIG. 2) for operating the vehicle without human intervention. In some examples, the vehicle also, in addition to or instead of a full autonomous mode, includes a semi-autonomous mode in which a human user is responsible for some or all control of the vehicle.

The vehicle 102 comprises one or more remote detection sensors 104 that receive return signals 108, 110 from the environment 100. Return signals 108, 110 may be reflected from objects, such as the object 112 and/or ground 113. The remote detection sensors 104 may include one or more active sensors, such as LIDAR or RADAR, that emit electromagnetic radiation 106 in the form of light or radio waves to generate return signals 108, 110. In some examples, the remote detection sensors 104 include a passive sensor, such as a set of stereoscopic cameras, that receive reflected ambient light or other radiation. The remote detection sensors 104 are shown on top of the vehicle 102. However, remote detection sensors 104 also may be positioned at any suitable position on the vehicle 102 including, for example, on a bumper, behind the windshield, etc.

The pose system 130 receives remote sensor data 144 and reference map data 146 and generates vehicle poses 148. One or more localizers 132, 134 utilize the remote sensor data 144 and the reference map data 146 to generate pose estimates that are provided to the pose state estimator 138.

The pose state estimator 138 also receives motion sensor data from one or more motion sensors such as, for example, an inertial measurement unit (IMU) 139, one or more encoders, such as encoder 140, and/or an odometer 142. Motion sensor data may be used to supplement pose estimates received from the one or more localizers 132, 134. Although two localizers 132, 134 are shown in FIG. 1, more or fewer localizers may be used. As will be explained further below, in sample embodiments one of the localizers 132, 134 comprises a ground intensity LIDAR localizer as described herein. It will be appreciated that, in such a case, the remote detection sensors 104 will include ground intensity sensors as described herein.

Figure 2:
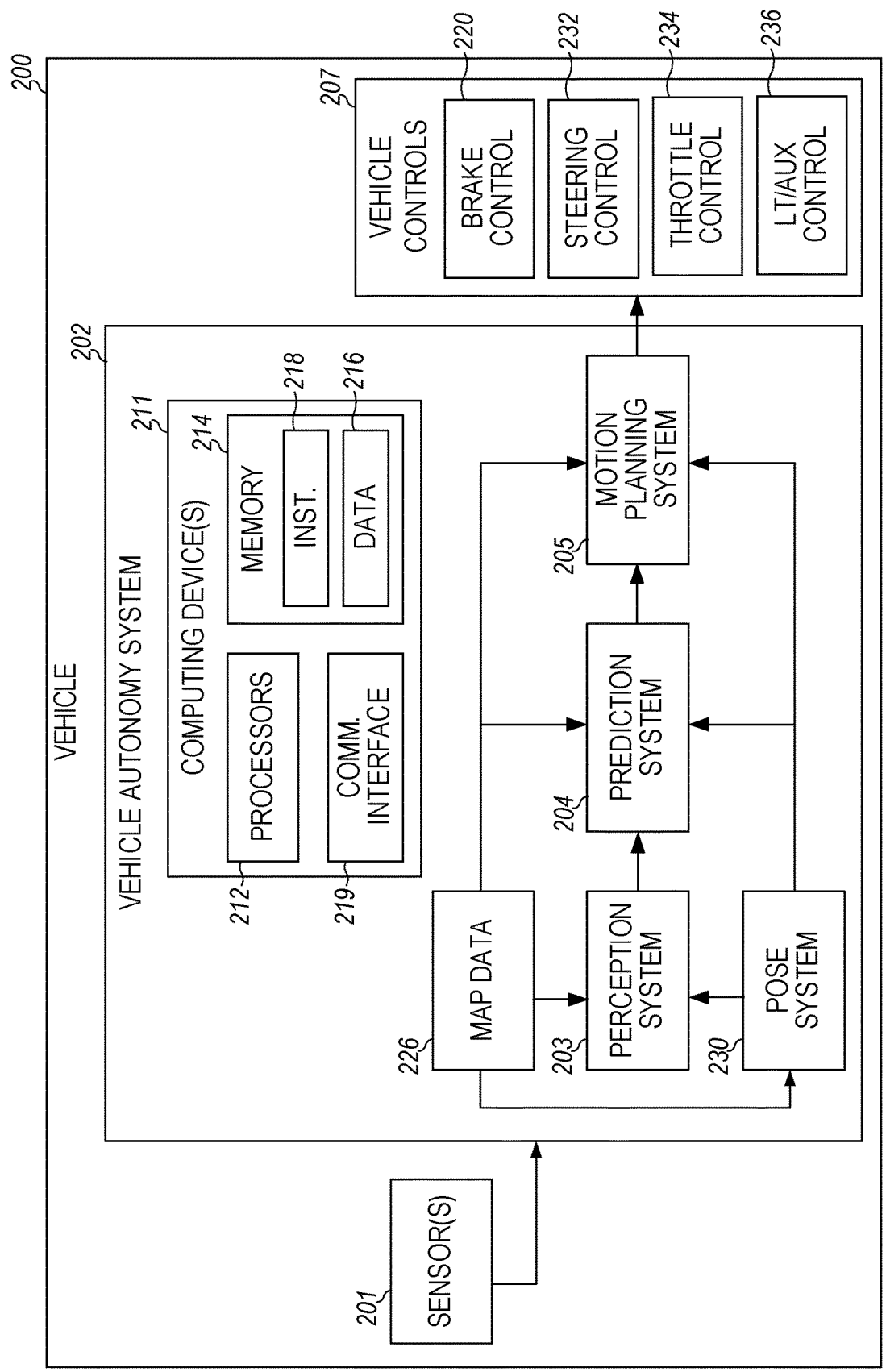
FIG. 2 is a block diagram showing one example of a vehicle autonomy system for an autonomous or semi-autonomous vehicle such as the vehicle illustrated in FIG. 1.

FIG. 2 is a block diagram showing one example of a vehicle 200 according to example aspects of the present disclosure. The vehicle 200 can be, for example, an autonomous or semi-autonomous vehicle such as vehicle 102 illustrated in FIG. 1. As illustrated, the vehicle 200 includes one or more sensors 201, a vehicle autonomy system 202, and one or more vehicle controls 207. The vehicle autonomy system 202 can be engaged to control the vehicle 200 or to assist in controlling the vehicle 200. The vehicle autonomy system 202, sometimes referred to as an Autonomous Vehicle (AV) stack, receives sensor data from the one or more sensors 201, attempts to comprehend the environment surrounding the vehicle 200 by performing various processing techniques on data collected by the sensors 201, and generates an appropriate motion path through the environment. The vehicle autonomy system 202 can control the one or more vehicle controls 207 to operate the vehicle 200 according to the motion path.

The vehicle autonomy system 202 includes a perception system 203, a prediction system 204, a motion planning system 205, and a pose system 230 that cooperate to perceive the surrounding environment of the vehicle 200 and determine a motion plan for controlling the motion of the vehicle 200 accordingly. The pose system 230 may be arranged to operate as described herein.

Various portions of the autonomous vehicle system 202 receive sensor data from the one or more sensors 201. For example, the sensors 201 may include remote detection sensors as well as other sensors, such as an inertial measurement unit (IMU), one or more encoders, one or more odometers, etc. The sensor data can include information that describes the location of objects within the surrounding environment of the vehicle 200, information that describes the motion of the vehicle, etc.

The sensors 201 may also include one or more remote detection sensors or sensor systems, such as a LIDAR, a RADAR, one or more cameras, etc. As one example, a LIDAR system of the one or more sensors 201 generates sensor data (e.g., remote sensor data) that includes the location (e.g., in three-dimensional space relative to the LIDAR system) of a number of points that correspond to objects that have reflected a ranging laser. For example, LIDAR system as described herein can measure distances by measuring the Time of Flight (TOF) that it takes a short laser pulse to travel from the sensor to an object and back, calculating the distance from the known speed of light. Similarly, a LIDAR ground intensity system as described herein can measure the distance to the ground and the intensity of light returned from the ground.

As another example, for a RADAR system of the one or more sensors 201 generate sensor data (e.g., remote sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the one or more sensors 201 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the one or more sensors 201 can include a positioning system that can determine a current position of the vehicle 200. The positioning system can be any device or circuitry for analyzing the position of the vehicle 200. For example, the positioning system can determine a position by using one or more of inertial sensors, a satellite positioning system such as a Global Positioning System (GPS), based on IP address, by using triangulation and/or proximity to network access points or other network components (e.g., cellular towers, Wi-Fi access points, etc.) and/or other suitable techniques. The position of the vehicle 200 can be used by various systems of the vehicle autonomy system 202.

Thus, the one or more sensors 201 can be used to collect sensor data that includes information that describes the location (e.g., in three-dimensional space relative to the vehicle 200) of points that correspond to objects within the surrounding environment of the vehicle 200. In some implementations, the sensors 201 can be located at various different locations on the vehicle 200. As an example, in some implementations, one or more cameras and/or LIDAR sensors can be located in a pod or other structure that is mounted on a roof of the vehicle 200 while one or more RADAR sensors can be located in or behind the front and/or rear bumper(s) or body panel(s) of the vehicle 200. As another example, camera(s) can be located at the front or rear bumper(s) of the vehicle 200 as well. Other locations can be used as well.

The pose system 230 receives some or all of the sensor data from sensors 201 and generates vehicle poses for the vehicle 200. A vehicle pose describes the position and attitude of the vehicle. The position of the vehicle 200 is a point in a three-dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis and a roll about a second horizontal axis. Together, the Cartesian coordinates and the pitch, yaw, and roll of the vehicle provide 6-degrees-of-freedom for the vehicle's pose. In some examples, the pose system 230 generates vehicle poses periodically (e.g., every second, every half second, etc.). The pose system 230 appends time stamps to vehicle poses, where the time stamp for a pose indicates the point in time that is described by the pose. The pose system 230 generates vehicle poses by comparing sensor data to reference map data 226 describing the surrounding environment of the vehicle 200. The pose system 230, in some examples, is arranged similar to the pose system 130 of FIG. 1. For example, the pose system 130 may comprise one or more localizers including a ground intensity LIDAR localizer as described herein as well as a pose state estimator.

The perception system 203 detects objects in the surrounding environment of the vehicle 200 based on sensor data, reference map data 226 and/or vehicle poses provided by the pose system 230. Reference map data 226, for example, may provide detailed information about the surrounding environment of the vehicle 200, for example, relating remote sensor data to vehicle position and/or attitude. The reference map data 226 can further provide information regarding the identity and location of different roadways, segments of roadways, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other reference data that provides information that assists the vehicle autonomy system 202 in comprehending and perceiving its surrounding environment and its relationship thereto. A roadway is a place where the vehicle can drive and may include, for example, a road, a street, a highway, a lane, a parking lot, a driveway, etc. The perception system 203 utilizes vehicle poses provided by the pose system 230 to place the vehicle 200 at a particular location and/or attitude, for example, based on reference data, and thereby predict which objects should be in the surrounding environment of the vehicle 200.

In some examples, the perception system 203 determines state data for one or more of the objects in the surrounding environment of the vehicle 200. State data may describe a current state of an object (also referred to as features of the object). The state data for each object describes, for example, an estimate of the object's current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 200; minimum path to interaction with the vehicle 200; minimum time duration to interaction with the vehicle 200; and/or other state information.

In some implementations, the perception system 203 can determine state data for each object over a number of iterations. In particular, the perception system 203 can update the state data for each object at each iteration. Thus, the perception system 203 can detect and track objects, such as vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 can generate prediction data associated with one or more of the objects detected by the perception system 203. In some examples, the prediction system 204 generates prediction data describing each of the respective objects detected by the perspective system 204.

Prediction data for an object can be indicative of one or more predicted future locations of the object. For example, the prediction system 204 may predict where the object will be located within the next 5 seconds, 20 seconds, 200 seconds, etc. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203. In some examples, the prediction system 204 also considers one or more vehicle poses generated by the pose system 230 and/or reference data 226.

In some examples, the prediction system 204 uses state data indicative of an object type or classification to predict a trajectory for the object. As an example, the prediction system 204 can use state data provided by the perception system 203 to determine that a particular object (e.g., an object classified as a vehicle) is approaching an intersection and maneuvering into a left-turn lane intends to turn left. In such a situation, the prediction system 204 can predict a trajectory (e.g., path) corresponding to a left-turn for the vehicle such that the vehicle turns left at the intersection. Similarly, the prediction system 204 can determine predicted trajectories for other objects, such as bicycles, pedestrians, parked vehicles, etc. The prediction system 204 can provide the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 determines a motion plan for the vehicle 200 based at least in part on the predicted trajectories associated with the objects within the surrounding environment of the vehicle, the state data for the objects provided by the perception system 203, vehicle poses provided by the pose system 230, and/or reference map data 226. Stated differently, given information about the current locations of objects and/or predicted trajectories of objects within the surrounding environment of the vehicle 200, the motion planning system 205 can determine a motion plan for the vehicle 200 that best navigates the vehicle 200 relative to the objects at such locations and their predicted trajectories on acceptable roadways.

In some implementations, the motion planning system 205 can evaluate one or more cost functions and/or one or more reward functions for each of one or more candidate motion plans for the vehicle 200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate pathway. The motion planning system 205 can select or determine a motion plan for the vehicle 200 based at least in part on the cost function(s) and the reward function(s). For example, the motion plan that minimizes the total cost can be selected or otherwise determined. The motion plan can be, for example, a path along which the vehicle 200 will travel in one or more forthcoming time periods. In some implementations, the motion planning system 205 can be configured to iteratively update the motion plan for the vehicle 200 as new sensor data is obtained from one or more sensors 201. For example, as new sensor data is obtained from one or more sensors 201, the sensor data can be analyzed by the perception system 203, the prediction system 204, and the motion planning system 205 to determine the motion plan.

Each of the perception system 203, the prediction system 204, the motion planning system 205, and the pose system 230, can be included in or otherwise a part of a vehicle autonomy system configured to determine a motion plan based at least in part on data obtained from one or more sensors 201. For example, data obtained by one or more sensors 201 can be analyzed by each of the perception system 203, the prediction system 204, and the motion planning system 205 in a consecutive fashion in order to develop the motion plan. While FIG. 2 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 205 can provide the motion plan to one or more vehicle control systems 207 to execute the motion plan. For example, the one or more vehicle control systems 207 can include throttle systems, brake systems, steering systems, and other control systems, each of which can include various vehicle controls (e.g., actuators or other devices that control gas flow, steering, braking, etc.) to control the motion of the vehicle. The various control systems 207 can include one or more controllers, control devices, motors, and/or processors.

The vehicle control systems 207 can include a brake control module 220 that is configured to receive a braking command from the vehicle autonomy system 202 (e.g., from the motion planning system 205), and in response, brake the vehicle 200. In some examples, the brake control module 220 includes a primary system and a secondary system. The primary system may receive braking commands and, in response, brake the vehicle 200. The secondary system may be configured to determine a failure of the primary system to brake the vehicle 200 in response to receiving the braking command.

A steering control system 232 is configured to receive a steering command from the vehicle autonomy system 202 (e.g., from the motion planning system 205) and, in response, provide a steering input to steer the vehicle 200. A throttle control system 234 is configured to receive a throttle command from the vehicle autonomy system (e.g., from the motion planning system 205) and, in response, provide a throttle input to control the engine or other propulsion system of the vehicle 200. A lighting/auxiliary control module 236 may receive a lighting or auxiliary command. In response, the lighting/auxiliary control module 236 may control a lighting and/or auxiliary system of the vehicle 200. Controlling a lighting system may include, for example, turning on, turning off, or otherwise modulating headlines, parking lights, running lights, etc. Controlling an auxiliary system may include, for example, modulating windshield wipers, a defroster, etc.

The vehicle autonomy system 202 includes one or more computing devices, such as the computing device 211, that may implement all or parts of the perception system 203, the prediction system 204, the motion planning system 205 and/or the pose system 230. The example computing device 211 can include one or more processors 212 and one or more memory devices (collectively referred to as memory) 214. The one or more processors 212 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 214 can include one or more non-transitory computer-readable storage mediums, such as Random-Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The memory 214 can store data 216 and instructions 218 which can be executed by the processor 212 to cause the vehicle autonomy system 202 to perform operations. The one or more computing devices 211 can also include a communication interface 219, which can allow the one or more computing devices 211 to communicate with other components of the vehicle 200 or external computing systems, such as via one or more wired or wireless networks. Additional descriptions of hardware and software configurations for computing devices, such as the computing device(s) 211 are provided below with respect to FIG. 10 and FIG. 11.

Ground Intensity LIDAR Localization

Ground intensity LIDAR (GIL) data is used to form GIL images in sample embodiments. The GIL images include a set of pixels in 2D coordinates, where each pixel contains an intensity value and a height value. Each pixel also contains the x- and y-gradients of intensity and height. The image representation for the height and intensity data is accomplished by filtering aggregated data falling into the same spatial bin on the ground. This representation is a sparse image, in that some pixels do not have values assigned. GIL images may be used to represent the GIL_LOCALIZER_PRIOR layer for each submap, as well as to accumulate readings observed on-vehicle over a short time window.

At the core of all the GIL system components is a registration algorithm, which takes two GIL images and aligns them relative to one another by estimating a 6-degree-of-freedom pose (with associated uncertainty) that minimizes the error between them. This is a nonlinear optimization problem that is solved, for example, using the Gauss-Newton or the Levenberg-Marquardt framework. The state is an 8-dimensional vector containing the 6-degree-of-freedom pose with a scale and offset (to account for intensity differences between sensors; these extra two variables could potentially be configured out when intensity calibration is consistent across vehicles).

The GIL Localizer (GILL) is responsible for on-vehicle estimation of map-relative pose at a rate of a few times per second (~3-10 Hz). The GILL accumulates LIDAR data over a few LIDAR sweeps and constructs a GIL image. The GIL image is registered against the prior for the current submap, and estimates are generated of the vehicle's pose relative to that submap's origin, with associated uncertainty. The initial guess for the GILL originates from a map-relative pose when it is valid; otherwise, the system is in bootstrapping mode, in which case the initial guess is obtained from a global pose task that can be either geometric, intensity-based, or other hypothetical future global pose implementation. The rate at which GILL runs does not affect the publication rate of the vehicle pose message. The pose filter publishes the vehicle pose at a rate of 100 Hz regardless of when or how many localizer map-relative pose estimates are provided to the pose filter.

In sample embodiments, the GILL is designed to obtain the best 6-degree-of-freedom estimate of the vehicle's position and orientation given an a priori built map of the environment (prior). Details on constructing the prior are described below. As just noted, the GILL prior is a collection of the 3D points on the ground surface along with a 2D image where each pixel contains reflectance and height information of the points. For ease of presentation, the 2-channel image representation will be denoted as two images. One contains reflectance information R, while the other contains the height information H.

At runtime, an unorganized 3D pointcloud is provided along with reflectance information denoted by: $\{X_i, r_i\}$. This pointcloud is obtained over a predefined, but configurable, period of time warped into a consistent frame given current estimates of the vehicle's Continuous Pose (CP). The input pointcloud contains points believed to be on the ground surface with height information denoted by $h_i$. In addition to the pointcloud, an initial estimate of the vehicle pose parameters, $\theta$, which may be the identity, is also provided.

The GILL refines the initial estimate of pose such as reflectance and height discrepancies between the prior and the input pointcloud so that the discrepancies are minimized (in a least-squares sense). The objective takes the form:

$$\mathrm{argmin}_{\Delta\theta,\alpha,\beta}\{f_R(\Delta\theta, \alpha, \beta) + f_H(\Delta\theta)\},$$

where:

$$f_R(\Delta\theta, \alpha, \beta) = \sum_{i=1}^{n} |\alpha R(w_r(X_i; \theta \oplus \Delta\theta)) + \beta - r_i|^2, \text{ and}$$

$$f_h(\Delta\theta) = \sum_{i=1}^{n} |H(w_h(X_i; \theta \oplus \Delta\theta)) - h_i|^2$$

The addition of the global gain and bias parameters $(\alpha, \beta)$ in the formulation above is included to address appearance variations and lack of reflectance calibration. The $\oplus$ notation denotes pose composition.

The warping functions $w_*$ denote transforming the input points with the current pose estimate, then selecting the appropriate coordinates for the objective. To represent the pose, 6-vector $\in se(3)$ is used to obtain the 4×4 rigid-body transformation matrix via the exponential map. That is, a warped point is given by:

$$X' = \exp(\theta) X$$

$$X' = \exp(\theta) X$$

It will be appreciated that prior to applying the matrix exponential, the 6-vector is converted to a 4×4 matrix via the hat operator. The reflectance warping function $w_r$ merely selects the first two coordinates of the warped point and maps them to the reflectance image coordinates using a predefined grid-size (discussed in the prior construction section below). The height warping function $w_h$ selects the third coordinates of the warped point (the z-coordinate).

Solving the (non-linear) optimization objective proceeds via standard methods. By performing a Taylor expansion of the objective, computing the derivative, and setting it to zero, the following linear system for the pose parameters is obtained:

$$\Sigma_{i=1}^{n}(J_r^T J_r + J_h^T J_h)\Delta\theta = -(\Sigma_{i=1}^{n} J_r^T \delta r_i + \Sigma_{i=1}^{n} J_h^T \delta h_i),$$

where $\delta r_i$ and $\delta h_i$ are the current reflectance and ground height error respectively:

$$\delta r_i = R(x_i) - r_i.$$

$$\delta h_i = H(x_i) - h_i$$

$R(x_i)$ and $H(x_i)$ are obtained with linear interpolation, and $J_r$ is the Jacobian of the reflectance objective with respect to the pose parameters evaluated at the current pose estimates (where optimization is performed within the vicinity of the origin on se(3)) and is given by:

$$J_r(X_i, \theta) = \frac{\partial f_r}{\partial \theta} = \nabla R(x_i) \frac{\partial \exp(\theta) X_i}{\partial \theta} \in R^{1\times 6} \nabla R(x_i) = [\partial R/u \;\; \partial R/v \;\; 0]$$

$$J_r(X_i, \theta) = \frac{\partial f_r}{\partial \theta} = \nabla R(x_i) \frac{\partial \exp(\theta) X_i}{\partial \theta} \in R^{1\times 6} \nabla R(x_i) = [\partial R/u \;\; \partial R/v \;\; 0],$$

where
is the gradient of the reflectance prior evaluated at the current warped coordinates. It is noted that the gradient values are computed via central-differences when constructing the prior and are interpolated at runtime. It is further noted that re-computing the gradients at runtime from scratch is an expensive operation. The approach taken here is usually sufficient (but compare Lucas-Kanade parametric image alignment).

The partial derivatives of the exponential map with respect to the warped coordinates can also be obtained in closed form as the 3×6 matrix: $([X_i]_x I_{3\times 3})$, where the brackets notation denotes the skew-symmetric matrix constructed from the transformed point given the current estimates of pose. The Jacobian of the height objective is obtained in a similar fashion and is given by:

$$J_h(X_i; \theta) = \nabla H(x_i) \frac{\partial f_h}{\partial \theta} \in R^{1\times 6}.$$

Finally, in similar manner, a solution for the global appearance change parameters is obtained that takes the form:

$$\Sigma_{i=1}^{n}(J_a^T J_a)\Delta a = -\Sigma_{i=1}^{n} J_a^T \delta r_i, \text{ where } J_a = \nabla R(x_i)[R(x_i) \;\; 1]$$

The process of linearization, solving the linear system and parameter accumulation is repeated iteratively until convergence.

In sample embodiments, iteratively re-weighted least squares (IRLS) with a Huber robust loss are used to improve robustness to noise and outliers. The scale of the Huber objective may be held fixed throughout the optimization. Contributions from every point to the objective also may be weighted by the uncertainty of reflectance and height information. This weighting may be hardcoded until the reflectance uncertainty model is determined from calibration. Also, to improve numerical conditioning, Tikhonov regularization may be applied to the design matrix prior to solving via the Cholesky decomposition (e.g., using Eigen's LDLT). In sample embodiments, all interpolation may be performed using bilinear interpolation.

Online Localization with GILL

Online localization with GILL includes ground point downselection where the data from the LIDAR is stored into a rolling buffer with a predetermined capacity. Spatial downsampling is performed in the X-Y plane to retain points within a bounding box centered at the vehicle's origin. Fast approximate plane fitting is performed to retain points that are most likely to belong to the ground surface. The pose of the subsampled ground points is estimated using the Levenberg-Marquardt Algorithm. Starting from an initial estimate of pose (which comes from the localization pose filter or other means) the problem is linearized and iteratively solved using robust loss functions in an iterative closest point (ICP) algorithm of the type used by standard localizers. Linearizing and solving this linear system is repeated until convergence or a fixed number of iterations has been reached.

Figure 3:
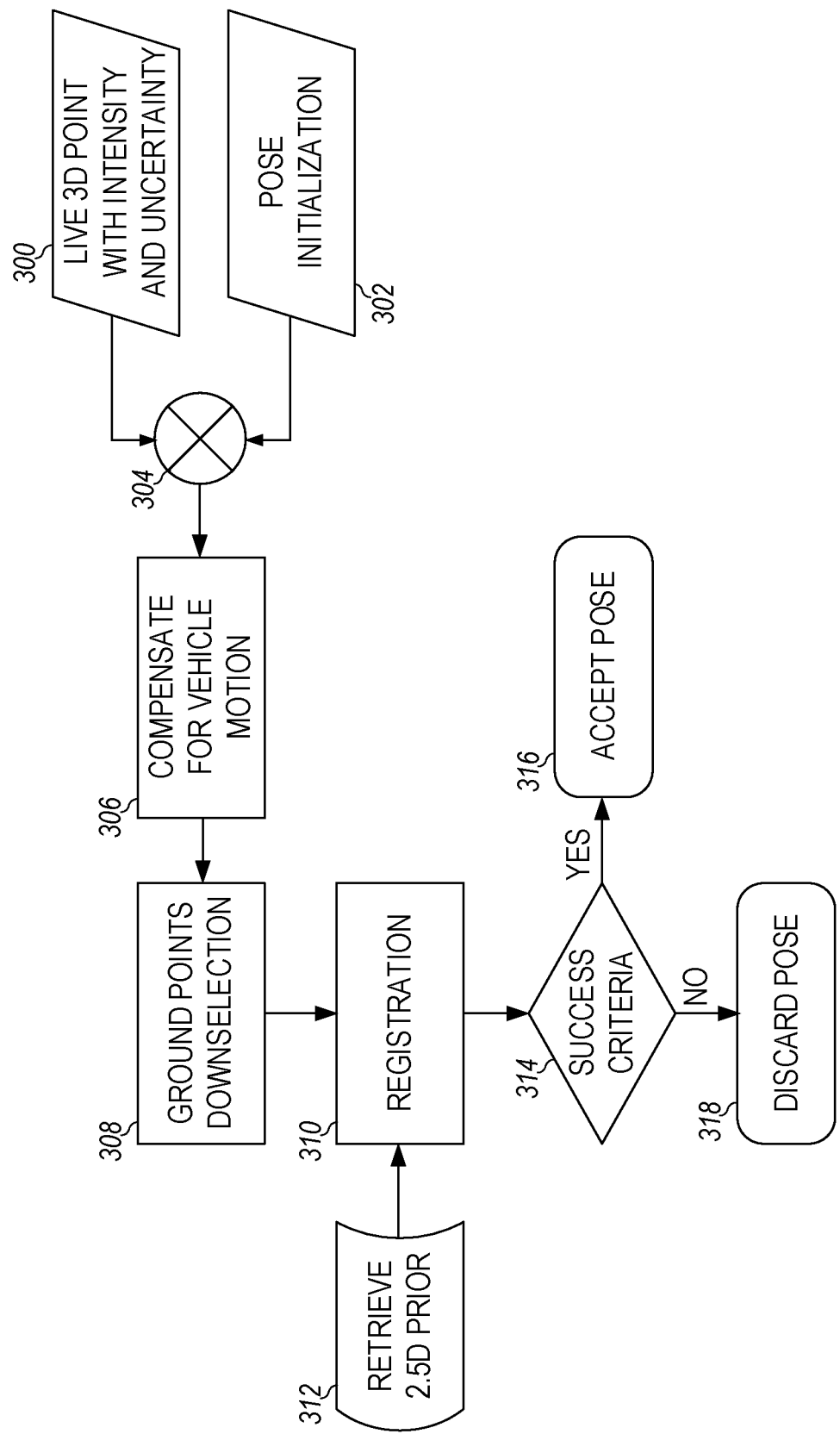
FIG. 3 is a schematic representation of the steps involved in estimating a vehicle's 6-degree-of-freedom orientation and position using ground intensity LIDAR localization in a sample embodiment.

A schematic representation of the steps involved in estimating the vehicles 6-degree-of-freedom orientation and position for online localization in a sample embodiment is shown in FIG. 3. In FIG. 3, live 3D point cloud data along with their intensity values and uncertainty estimates are provided at 300 and combined with a pose seed (initialization) 302 by combiner 304. The initialized pose is estimated using a filtering pose that predicts the pose of the vehicle in the future. The pose initialization is then used to account for the LIDAR's ego-motion at the compensate for vehicle motion at step 306. This is performed by transforming each LIDAR point with the given initialization, interpolated as necessary, to bring the points into a consistent coordinate system. The points are stored in a rolling-buffer accumulating points over a period of, for example, 0.5 seconds.

Figure 4:
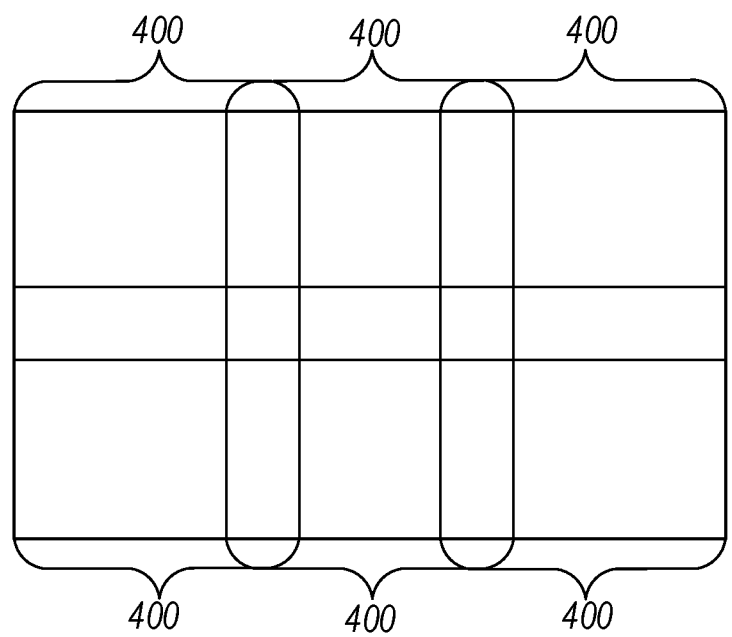
FIG. 4 illustrates the world discretized into partially overlapping rectangles, or cells, for ground points downselection in a sample embodiment.

Next, the LIDAR ground points in the rolling buffer are downselected in two ways at 308. First, only points within a certain radius from the LIDAR are retained using each point's range estimate (spatial filtering). Second, only points believed to be on the ground surface are retained (ground downselection), which is performed after the spatial downselection step for improved performance. The ground down selection algorithms operate as follows:

Discretize the world into partially overlapping rectangles, or cells 400, as shown in FIG. 4. In a sample embodiment, each cell may be set to 10×10 cm$^2$.

For every cell, determine which LIDAR points are candidates to be classified as ground points. This is performed by choosing points with height estimates closest to the expected ground height. The maximum and minimum LIDAR range may be specified (e.g., 2-25 m).

For every candidate ground point, perform a RANSAC-based plane fitting approach to determine which points belong to the ground plane based on a user-specified threshold and are thus bucketed in the grid of cells 400. Points that fit well into a ground plane (with normal pointing predominantly along the z-axis) are retained if they satisfy the minimum number of inliers per cell 400 and are used in subsequent pose estimation. The intensity values and height values are thus stored at the corresponding XY grid position in the ground plane.

The ground points are registered at 310 with semi-dense 2.5D image priors provided at 312 by performing the optimization described above. The 2.5D image priors include pixels that encode two pieces of information along with their uncertainties: height from the ground and intensity return. The success of the pose registration step 310 is evaluated at 314. The success criteria include:

The overlap percentage between the online point cloud and the prior at the termination of the registration step.

The percentage of points with weights greater than a threshold. The weights are determined during the registration process and correlate with errors. More specifically, the weights are obtained using the robust loss function.

The uncertainty of the estimates, which are obtained from the optimization steps described above. The uncertainty is obtained as the (weighted) inverse of the Gauss-Newton approximation to the Hessian at the solution.

Deviation from the provided initialization. The registration is often expected not to deviate vastly from the provided initialization.

If the pose satisfies the success criteria, the pose is accepted at 316; otherwise, the pose is discarded at 318. Live points that lie outside of the prior may be discarded. Also, optionally, coarse alignment using height only may be applied to the cells 400.

The method illustrated in FIG. 3 may be improved in a number of ways. For example, good LIDAR reflectance calibration may be provided. The addition of global appearance change parameters (gain+bias) may help, but two global variables cannot accurately capture the vast appearance differences due to LIDAR miscalibration. Also, the image alignment may be implemented in scale-space. Experience with image alignment and direct simultaneous localization and mapping (SLAM) indicates that scale space can improve convergence and potentially accuracy. Some computational gains also may be obtained by ignoring prior points with vanishing reflectance or height gradients as they do not contribute to the objective. Also, a point may be considered for optimization if both reflectance and height information are valid. However, it will be appreciated that constraints from reflectance and height are independent and may be included in the optimization. In addition, if a 2D image (or some other lattice to allow computing reflectance and height gradients) can be constructed from the input LIDAR data, vast computational improvements can be gained by reformulating the problem as Inverse Compositional alignment as all Jacobians can be pre-computed offline when constructing the prior.

Prior Construction (Offline)

In sample embodiments, a prior is constructed offline and deployed to a vehicle. To construct the prior, the world is discretized into a fixed size grid/cells 400 as illustrated generally in FIG. 4. For example, the area of each grid may be 0.1 m². The ground points are then determined using LIDAR points having known positions in the world as obtained during a map build. A robust fitting of a 3D plane using the RANSAC algorithm may be used to determine points with a high likelihood of being on the ground plane. The LIDAR data is then aggregated and filtered to determine a single height and intensity value per cell. For every pixel in the discretized grid, all points that fall into the pixel are tracked and, once all data has been aggregated, the pixel data is filtered. For example, the data is filtered to determine potential measurements with "outlier" intensity values. Outliers arise from either a bad calibration, or the discretization grid straddling an intensity discontinuity in the world. Outliers are determined as points whose intensity values are more than a predetermined threshold from a robust estimate of the standard deviation of distribution of intensities per cell. Once the outliers have been removed, a single intensity value is assigned to a pixel using an uncertainty weighted mean. Uncertainties are either determined from an offline calibration model, or an educated guess of the intensity fall-off model. Farther points have higher intensity uncertainty. These steps are repeated for the height data as well.

Given that LIDAR data is unorganized (i.e., has variable density) in combination with outlier filtering, some pixels remain unfilled (i.e., holes remain in the final prior). The pixels are filled in using neighboring pixels with valid intensity values. The neighbor contributions are spatially weighted using a Gaussian filter with a predetermined standard deviation.

The final prior image is determined to encompass all valid pixels. All large empty areas are trimmed. Only valid pixels and their values are stored as the prior. For every valid pixel, the following is stored in a sample embodiment: row index 16-bit integer, column index 16-bit integer, intensity value 8-bit integer, height value 16-bit IEEE-754 half-precision float, and a set of metadata per prior. In sample embodiments, the metadata includes scalar factors to contribute pixel units to meters in the world and a mapping from the origin of the prior in pixel (0,0) to the corresponding (X,Y) world coordinates where the heights are relative to the origin in the map (e.g. sea level).

Figure 5:
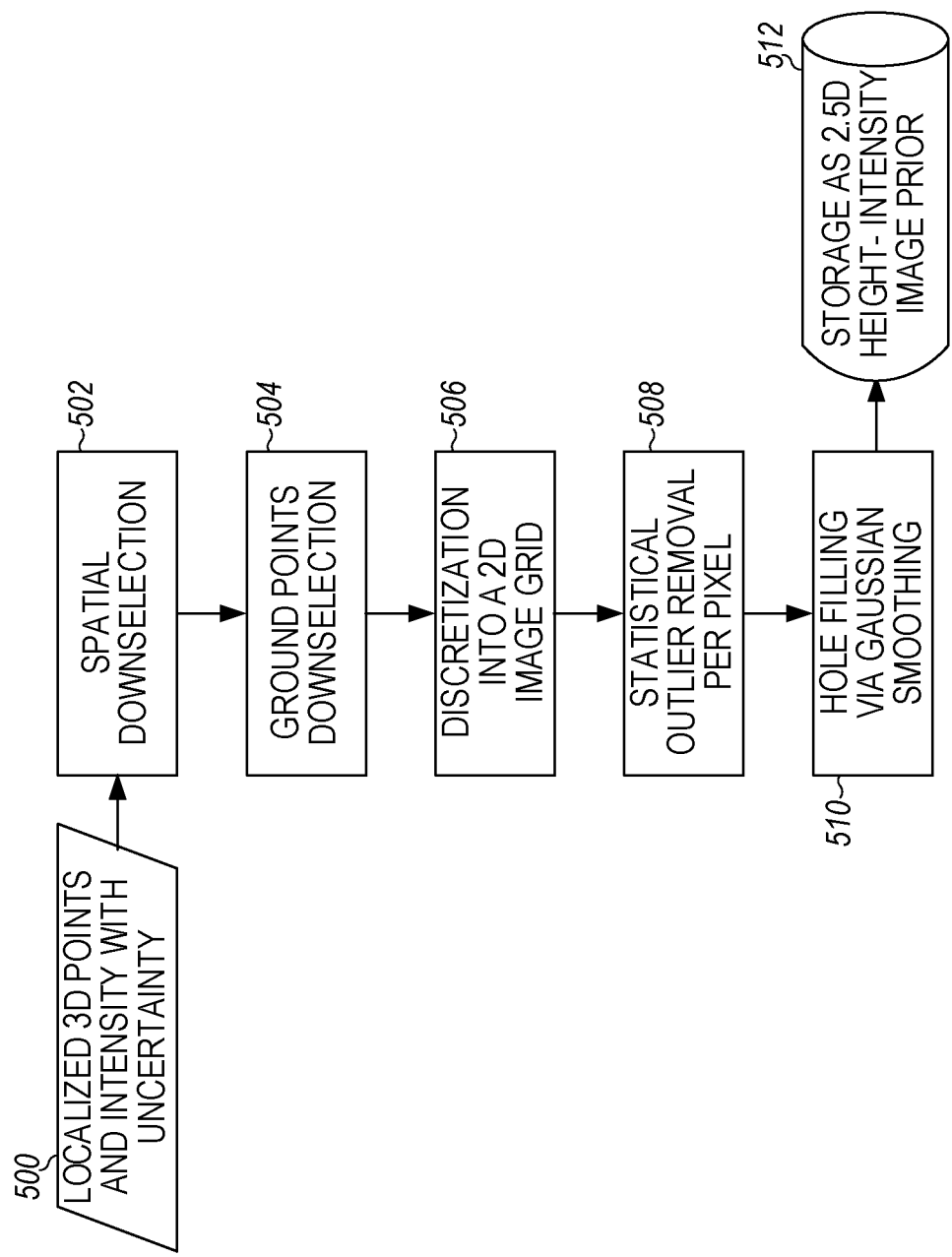
FIG. 5 is a schematic representation of the steps involved in constructing a prior from LIDAR data and the inferred ground using localized LIDAR and intensity points in a sample embodiment.

In a sample embodiment, the prior is constructed from LIDAR data and the inferred ground using localized LIDAR and intensity points as shown in FIG. 5. FIG. 5 illustrates a schematic of the steps performed when generating the GILL priors from the localized LIDAR data in sample embodiments. As illustrated in FIG. 5, the method starts with providing the live 3D point cloud data along with their intensity values and uncertainty estimates at 500. The point cloud data may be pulled from localizer data logs that localize collected LIDAR data to map relative pose over, for example, several passes down the same street during the map building process. Spatial downselection is performed at step 502 and ground points downselection is performed at 504 as described above with respect to FIG. 3. In steps 502 and 504, data is read from appropriate map layer and points are discarded if the LIDAR point elevation is larger than a threshold (e.g., 10 cm), if the LIDAR range return is larger than a threshold (e.g., 50 m), and if map-relative pose or continuous pose are invalid. The downselected points are then discretized into a 2D image grid at 506. Discretizing the ground points into a 2D grid includes establishing the resolution of each grid cell (e.g., 10×10 cm²) and determining the reflectance and height value per cell as the weighted average (or median) of all data falling into the cell. The weights are based on each point's range and intensity estimated uncertainties. The uncertainties for LIDAR data are related to range (higher uncertainty at longer range), while uncertainties for the intensity measurements conform to a calibration model, which is a function of raw LIDAR point range and intensity strength. It will be appreciated that representing an image as a 2D grid enables the exploitation of the lattice structure of the 2D grid in order to obtain an efficient estimate of the gradient. Statistical outliers are removed on a per pixel basis at 508, and any holes in the ground intensity data are filled by Gaussian smoothing at 510 before the data is stored as a 2.5D height-intensity image prior at 512 for deployment to a vehicle. Filling in holes to construct an "image" presentation may be performed via Gaussian filtering/diffusion. For pixels with no height, or intensity measurements, a Gaussian kernel of a small radius (1 or 2 pixels) may be used to fill in the missing values from neighboring pixels. The 2.5D reflects that the data is not 3D data but the 2.5D data includes the height data discretized onto the 2D image grid as described herein.

Thus, in addition to estimating the pose of a relatively sparse LIDAR point cloud with respect to semi-dense priors, the 6-degree-of-freedom alignment pose between semi-dense priors may be calculated, which is a step required to stitch multiple priors together to form a larger prior during map building (see below).

Figure 6A:
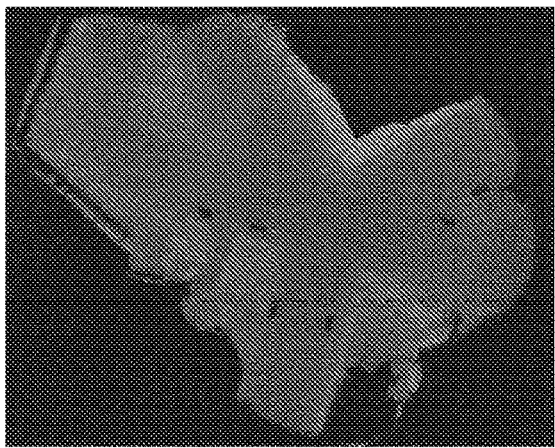
FIGS. 6A-6F illustrate examples of the intensity (reflectance) and height priors along with their gradients.
Figure 6B:
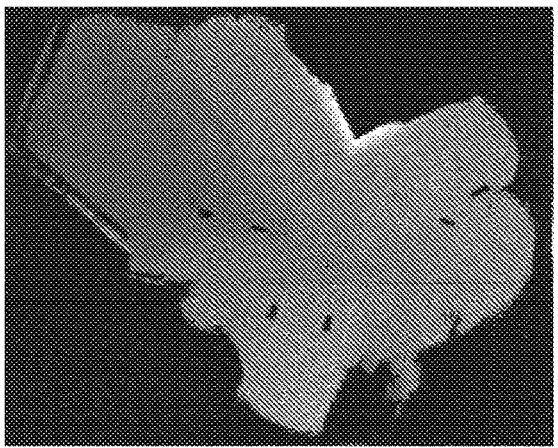
Figure 6C:
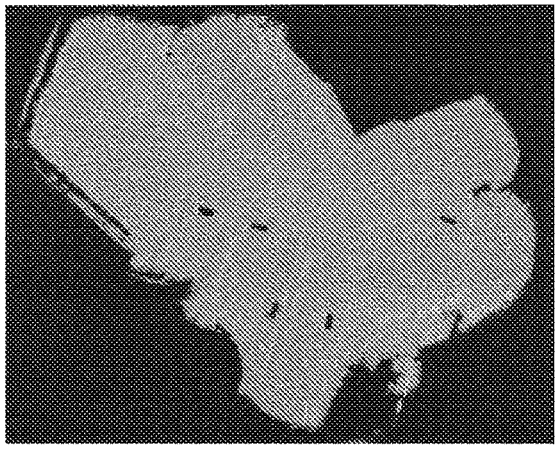
Figure 6D:
Figure 6E:
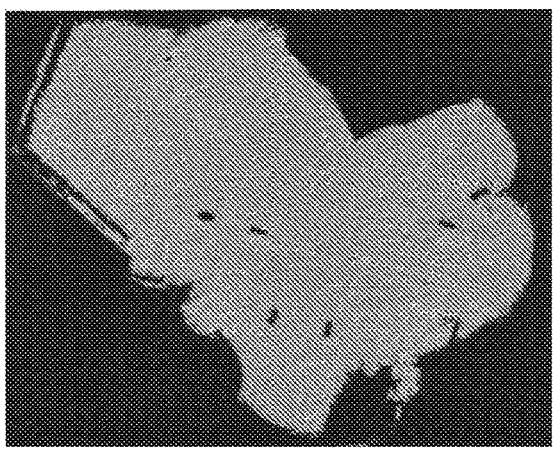
Figure 6F:
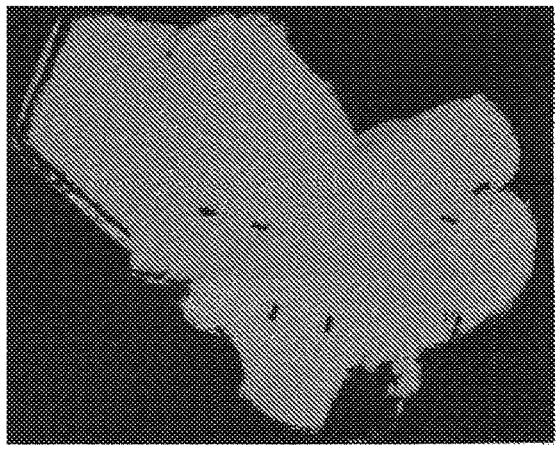

Examples of the intensity (reflectance) and height priors along with their gradients are illustrated in FIGS. 6A-6F. FIG. 6A illustrates the constructed intensity image, while FIG. 6B illustrates the constructed height image. FIG. 6C illustrates the intensity gradient along the x-direction, while FIG. 6D illustrates the height gradient along the x-direction. Similarly, FIG. 6E illustrates the intensity gradient along the y-direction, while FIG. 6F illustrates the height gradient along the y-direction.

Applications to Offline Map Building

During a map build, the LIDAR scans are sparser and it is more challenging to obtain a robust estimate of the pose using the Levenberg-Marquardt approach. This is addressed in sample embodiments by using a set of LIDAR scans with their intensities to construct a sparse map build prior. The points collected in this stage rely on the accuracy of the provided continuous pose to put them into a consistent frame. A predetermined amount of travelled time/distance is used to determine the size of the map build prior.

Figure 7:
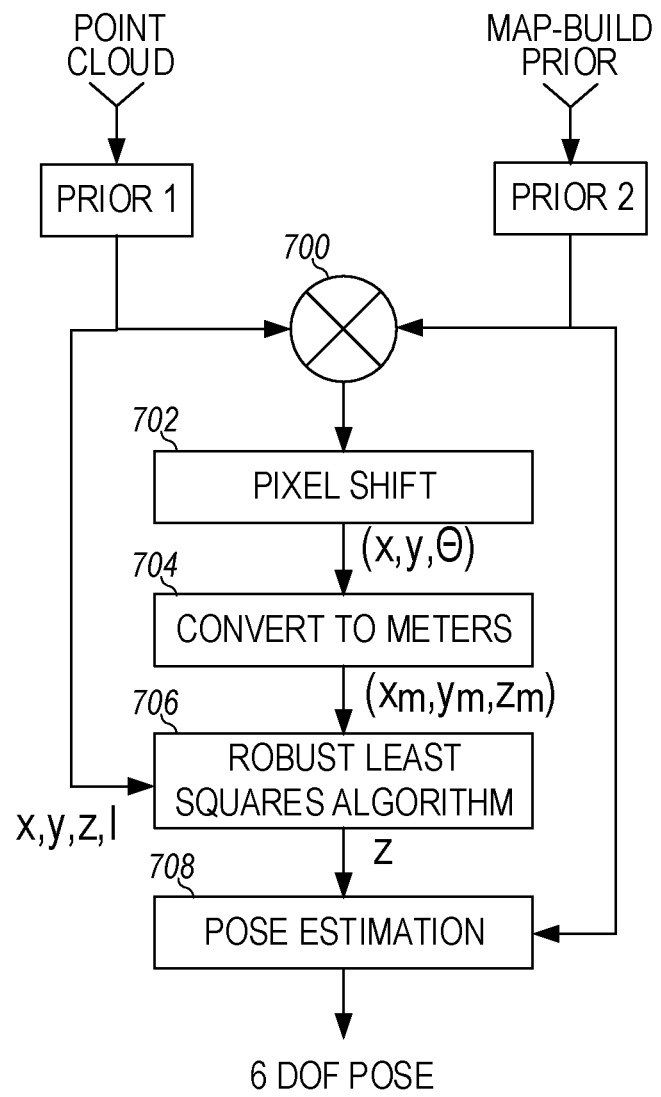
FIG. 7 illustrates prior matching using template matching techniques in a sample embodiment.

The process of estimating the pose between two map-build priors is achieved using template matching techniques from image processing. FIG. 7 illustrates prior matching using template matching techniques in a sample embodiment. For example, an initial estimate of the uv pixel shifts from both (sparse) priors Prior 1 (from pointcloud) and Prior 2 (map-build prior) is determined by combining Prior 1 and Prior 2 using cross-correlator 700. The combined priors are treated as an image, and the optimal shift is found at 702 that maximizes the Zero-Mean Normalized Cross Correlation. The uv pixel shift (x, y, θ) is converted into an XY shift in meters at 704 using the known conversion scale factor from pixels to meters. Upon applying the XY shift to the ground points, an estimate of the Z translation is obtained using a robust least squares algorithm at 706. To further improve the refinement, the initial estimates from the Zero-Mean Cross Correlation and robust least squares for the scale axis are combined and passed down to the same online pose estimation module (using the Levenberg-Marquardt algorithm) for pose estimation at 708. The quality of the match between the two sparse priors is determined by examining the sharpness of the correlation surface. Matches are deemed acceptable if the local maxima of the correlation surface (across all possible uv shifts) is distinctive enough locally as well as in comparison to the second peak in cost. This step is used to detect potential aliasing and unreliable matches which are discarded from the map build process. The resulting 6-degrees-of-freedom pose estimate is then output for further map building.

Figure 8A:
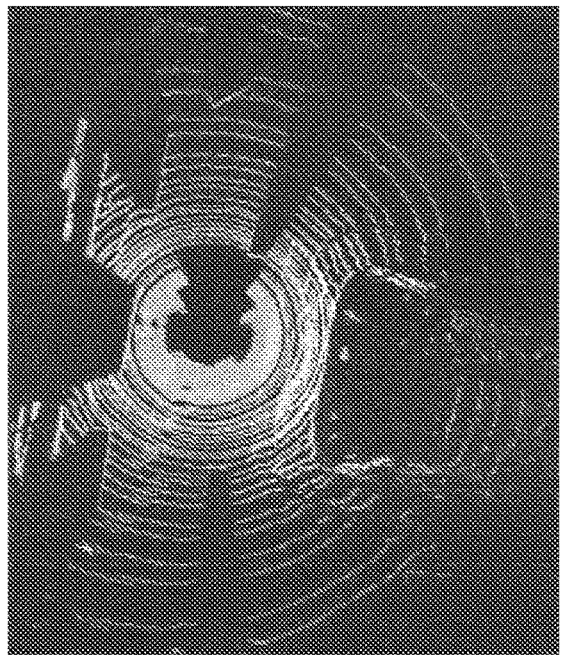
FIGS. 8A-8D illustrate a comparison between an intensity-based map and full 3D priors.
Figure 8B:
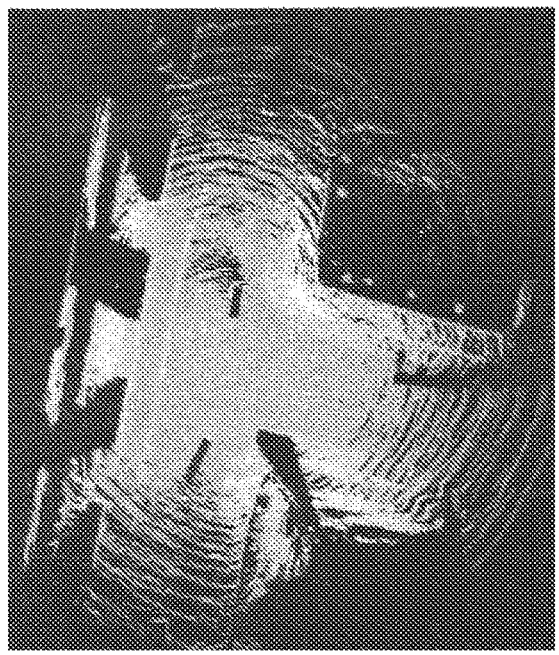
Figure 8C:
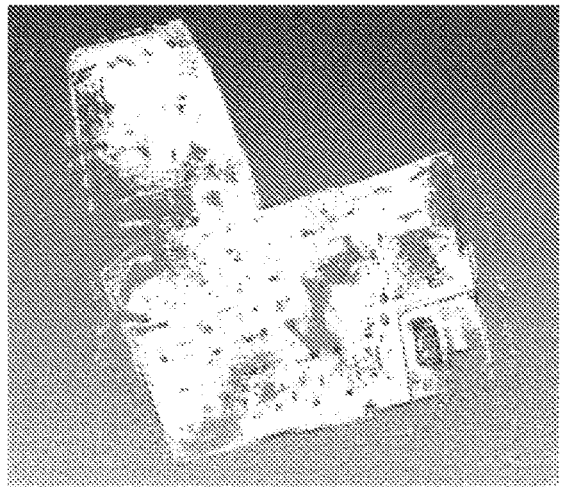
Figure 8D:
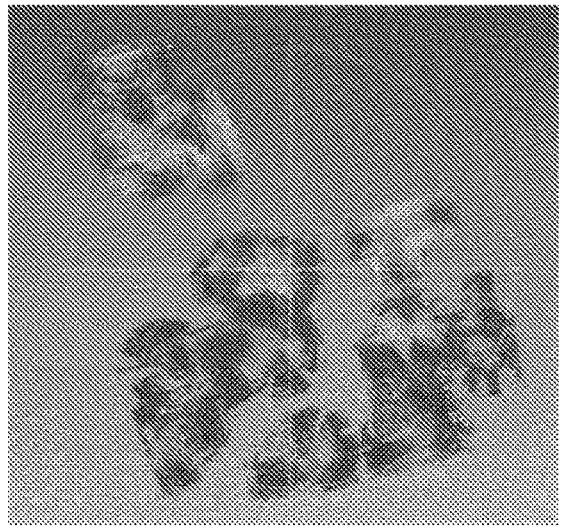

The ground intensity LIDAR localization techniques described herein also may be used as supplemental constraints to offline map building. Generally, multiple priors are constructed as described above, and the multiple priors are then co-registered using template matching techniques commonly used in computer vision and image processing. Unlike the case of online localization, where the prior can be built with a sufficient number of data collection logs guaranteeing a sufficient pixel density, building the priors on the fly results in fairly noisy and sparse priors as shown in FIG. 8. FIG. 8 illustrates a comparison between an intensity-based map and full 3D priors. FIG. 8A illustrates a single sweep of LIDAR with intensity data, which is relatively sparse, while FIG. 8B illustrates multiple LIDAR sweeps accumulated over a short period of time and travel distance to provide a more robust intensity reference map. Unlike the offline prior build output, the intensity reference map is sparser and has more noise especially towards the periphery. FIG. 8C illustrates an example of a prior build from all LIDAR data where the prior is sufficiently dense with good coverage of the target area. In contrast, FIG. 8D illustrates the same area built with intensity data only. The reasons for the sparsity is the requirement in limiting the LIDAR range to useable values as the attenuation of the LIDAR intensity signal is inversely proportional to the range squared.

Figure 9:
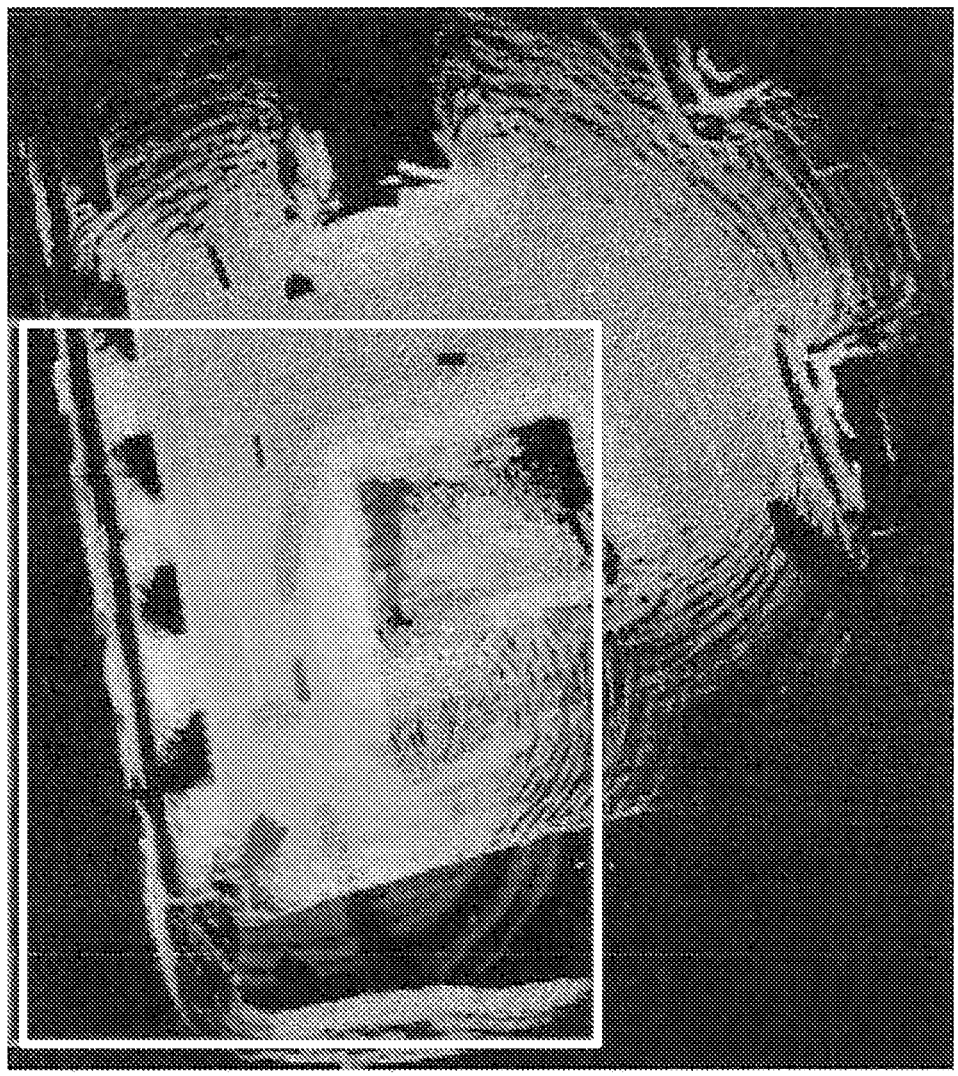
FIG. 9 illustrates a template matching procedure performed for an initialized X-Y estimate of the pose in a sample embodiment.

Given the sparsity and noise when building an intensity-based prior from a limited number of LIDAR sweeps, the registration approach that is typically performed when the vehicle is online is not suitable here. Instead, an initialized X-Y estimate of the pose is performed using template matching techniques from computer vision. In particular, an X-Y pixel shift in the image plane is found that maximizes the zero-mean normalized cross correlation. A demonstration of the template matching procedure is illustrated in FIG. 9. In FIG. 9, the points 800 are LIDAR intensity image generated using the prior construction procedure described above, while the points 802 are live keyframes that are also constructed using the same prior construction procedure. The optimal pixel shift is the one the maximizes the zero-mean normalized cross correlation between the reference map and the input keyframe.

Once the optimal X-Y pixel shift has been determined, it is transformed to metric X-Y estimates in meters. The estimated shift in meters is given by $x_{meter}=u_{pixel}*S+O$, where 'S' is the pixel size and 'O' is the origin of the constructed prior in world coordinates. The output of template matching in metric units is then provided to the same online registration step as the initialization (seed). Such use of robust template matching techniques on the constructed LIDAR intensity-based images provide a robust 2D estimate of motion that can be later refined to full 6-degrees-of-freedom.

Computer System

Figure 10:
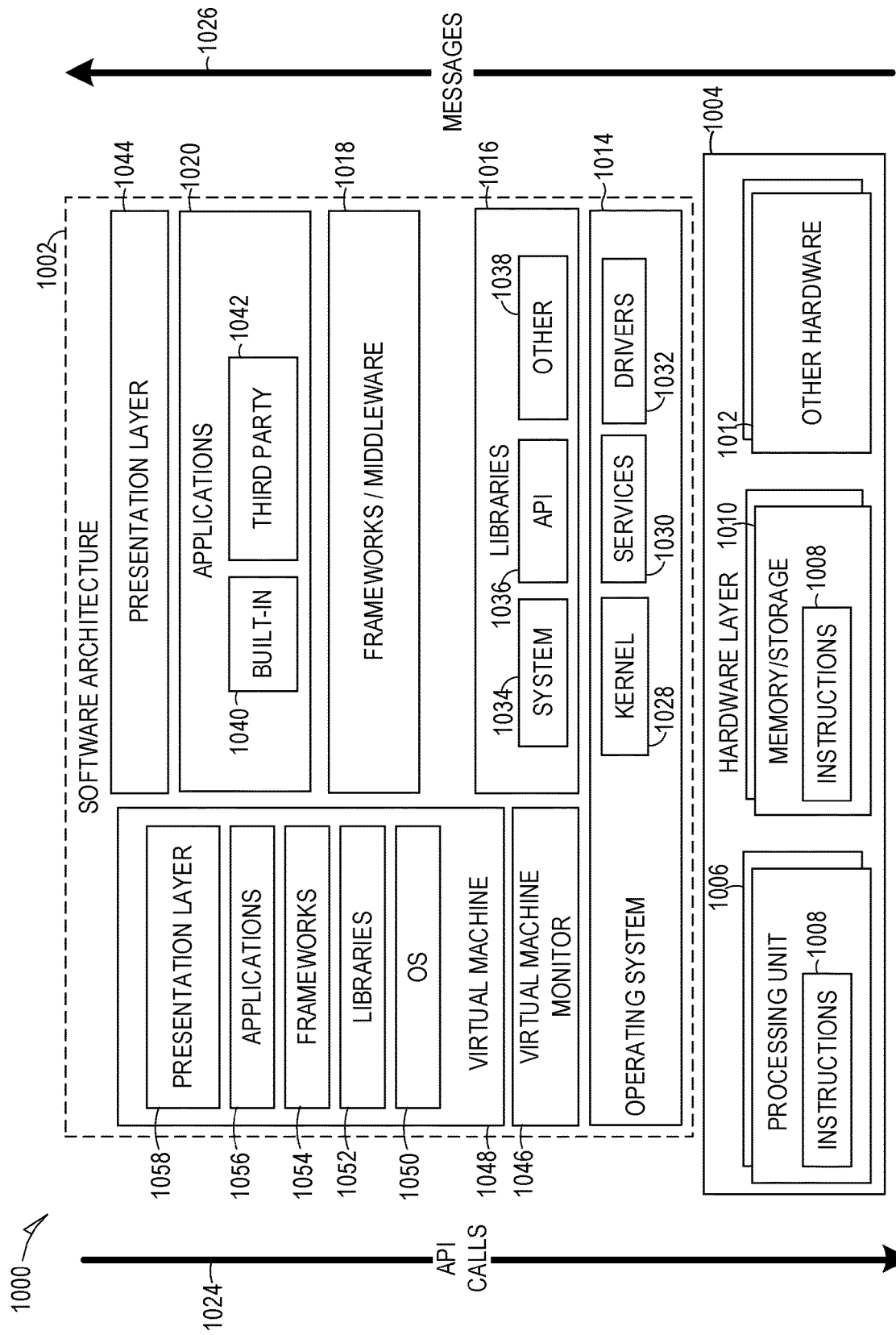
FIG. 10 is a block diagram showing one example of a software architecture for a computing device in a sample embodiment.

FIG. 10 is a block diagram 1000 showing one example of a software architecture 1002 for a computing device. The software architecture 1002 may be used in conjunction with various hardware architectures, for example, as described herein. FIG. 10 is merely a non-limiting example of a software architecture 1002 and many other architectures may be implemented to facilitate the functionality described herein. A representative hardware layer 1004 is illustrated and can represent, for example, any of the above-referenced computing devices. In some examples, the hardware layer 1004 may be implemented according to an architecture 1100 of FIG. 11 and/or the architecture 1002 of FIG. 10.

The representative hardware layer 1004 comprises one or more processing units 1006 having associated executable instructions 1008. The executable instructions 1008 represent the executable instructions of the software architecture 1002, including implementation of the methods, modules, components, and so forth of FIGS. 1-9. The hardware layer 1004 also includes memory and/or storage modules 1010, which also have the executable instructions 1008. The hardware layer 1004 may also comprise other hardware 1012, which represents any other hardware of the hardware layer 1004, such as the other hardware illustrated as part of the architecture 1100 in FIG. 11.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and a presentation layer 1044. Operationally, the applications 1020 and/or other components within the layers may invoke API calls 1024 through the software stack and receive a response, returned values, and so forth illustrated as messages 1026 in response to the API calls 1024. The layers illustrated are representative in nature and not all software architectures have all layers. For example, some mobile or special-purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of a hardware or software interrupt and, in response, cause the software architecture 1002 to pause its current processing and execute an Interrupt Service Routine (ISR) when an interrupt is received. The ISR may generate an alert.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than by interfacing directly with the underlying operating system 1014 functionality (e.g., kernel 1028, services 1030, and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., Web Kit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be utilized by the applications 1020 and/or other software components/modules. For example, the frameworks 1018 may provide various graphical user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. The third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™ Windows® Phone, or other computing device operating systems. In this example, the third-party application 1042 may invoke the API calls 1024 provided by the mobile operating system such as the operating system 1014 to facilitate functionality described herein.

The applications 1020 may utilize built-in operating system functions (e.g., kernel 1028, services 1030, and/or drivers 1032), libraries (e.g., system libraries 1034, API libraries 1036, and other libraries 1038), or frameworks/middleware 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 10, this is illustrated by a virtual machine 1048. A virtual machine creates a software environment where applications/modules can execute as if they were executing on a hardware computing device. The virtual machine 1048 is hosted by a host operating system (e.g., the operating system 1014) and typically, although not always, has a virtual machine monitor 1046, which manages the operation of the virtual machine 1048 as well as the interface with the host operating system (e.g., the operating system 1014). A software architecture executes within the virtual machine 1048, such as an operating system 1050, libraries 1052, frameworks/middleware 1054, applications 1056, and/or a presentation layer 1058. These layers of software architecture executing within the virtual machine 1048 can be the same as corresponding layers previously described or may be different.

Figure 11:
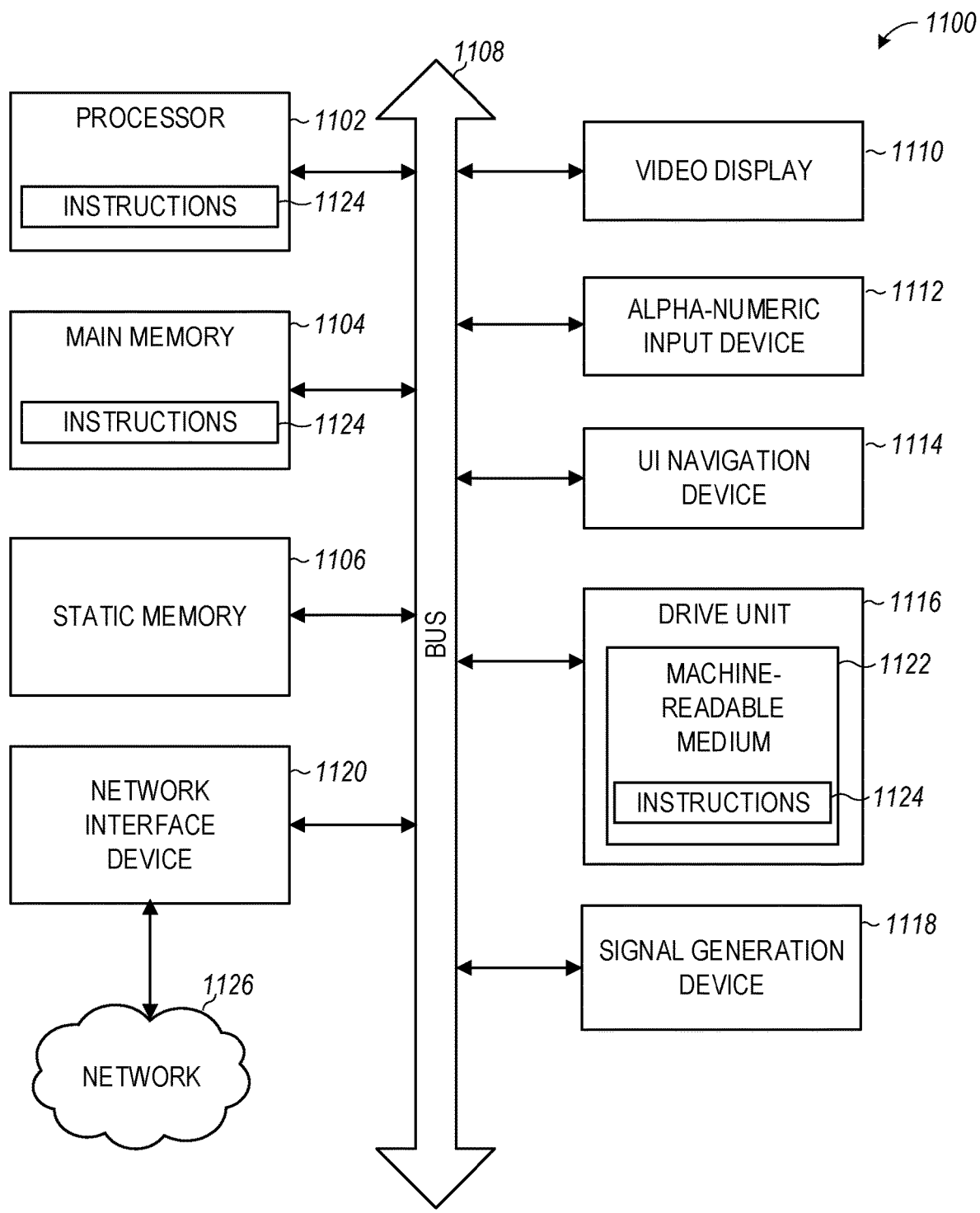
FIG. 11 is a block diagram illustrating a computing device hardware architecture within which a set or sequence of instructions can be executed to cause a machine to perform examples of any one of the methodologies described in sample embodiments.

FIG. 11 is a block diagram illustrating a computing device hardware architecture 1100, within which a set or sequence of instructions can be executed to cause a machine to perform examples of any one of the methodologies discussed herein. The architecture 1100 may describe, a computing device for executing the local map server and multiplexer described herein.

The architecture 1100 may operate as a standalone device or may be connected (e.g., networked) to other machines. In a networked deployment, the architecture 1100 may operate in the capacity of either a server or a client machine in server-client network environments, or it may act as a peer machine in peer-to-peer (or distributed) network environments. The architecture 1100 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1100 includes a processor unit 1102 comprising at least one processor (e.g., a central processing unit (CPU), a graphics processing unit (GPU), or both, processor cores, compute nodes, etc.). The architecture 1100 may further comprise a main memory 1104 and a static memory 1106, which communicate with each other via a link 1108 (e.g., bus). The architecture 1100 can further include a video display unit 1110, an input device 1112 (e.g., a keyboard), and a UI navigation device 1114 (e.g., a mouse). In some examples, the video display unit 1110, input device 1112, and UI navigation device 1114 are incorporated into a touchscreen display. The architecture 1100 may additionally include a storage device 1116 (e.g., a drive unit), a signal generation device 1118 (e.g., a speaker), a network interface device 1120, and one or more sensors (not shown), such as a Global Positioning System (GPS) sensor, compass, accelerometer, or other sensor.

In some examples, the processor unit 1102 or another suitable hardware component may support a hardware interrupt. In response to a hardware interrupt, the processor unit 1102 may pause its processing and execute an ISR, for example, as described herein.

The storage device 1116 includes a machine-readable medium 1122 on which is stored one or more sets of data structures and instructions 1124 (e.g., software) embodying or utilized by any one or more of the methodologies or functions described herein. The instructions 1124 can also reside, completely or at least partially, within the main memory 1104, within the static memory 1106, and/or within the processor unit 1102 during execution thereof by the architecture 1100, with the main memory 1104, the static memory 1106, and the processor unit 1102 also constituting machine-readable media.

Executable Instructions and Machine-Storage Medium

The various memories (i.e., 1104, 1106, and/or memory of the processor unit(s) 1102) and/or storage device 1116 may store one or more sets of instructions and data structures (e.g., instructions) 1124 embodying or utilized by any one or more of the methodologies or functions described herein. These instructions, when executed by processor unit(s) 1102 cause various operations to implement the disclosed examples.

As used herein, the terms "machine-storage medium," "device-storage medium," "computer-storage medium" (referred to collectively as "machine-storage medium 1122") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1122 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1122 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1124 can further be transmitted or received over a communications network 1126 using a transmission medium via the network interface device 1120 utilizing any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of such features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A system for determining a pose of a vehicle, comprising:
   at least one processor; and
   a non-transitory, machine-readable medium comprising instructions thereon that, when executed by the at least one processor, cause the at least one processor to perform operations comprising:
   receiving ground intensity LIDAR data describing a first ground point, the ground intensity LIDAR data comprising first intensity data describing the first ground point and height data describing the first ground point;
   forming a first Ground Intensity LLDAR (GIL) image comprising a plurality of pixels arranged on a two-dimensional grid, a first pixel of the plurality of pixels comprising: a height value for the first ground point, a height gradient value for the first ground point, an intensity value for the first ground point, and an intensity gradient value for the first ground point;
   estimating a 6-degree-of-freedom pose that minimizes an error between the first GIL image and an image prior; and
   returning the 6-degree-of-freedom pose as a pose estimate for the vehicle.

2. The system of claim 1, wherein the estimating of the 6-degree-of-freedom pose comprises aligning the first GIL image and the image prior using at least one of a Gauss-Newton framework or a Levenberg-Marquardt framework for solving a nonlinear optimization problem that generates the 6-degree-of-freedom pose.

3. The system of claim 1, further comprising receiving an initial estimate of vehicle pose parameters, the estimating of the 6-degree-of-freedom pose being based at least in part on the initial estimate of vehicle pose parameters.

4. The system of claim 1, wherein receiving the ground intensity LIDAR data comprises:
   receiving a 3D point cloud including intensity values and uncertainty estimates;
   receiving a pose initialization estimate; and
   combining the 3D point cloud and pose initialization estimate.

5. The system of claim 4, the 3D point cloud comprising a plurality of LIDAR points, the operations further comprising:
   transforming each of the plurality of LIDAR points with the pose initialization estimate to bring the respective LIDAR points into a consistent coordinate system; and
   storing the transformed LIDAR points in a rolling buffer that accumulates LIDAR points over a period of time.

6. The system of claim 5, the operations further comprising applying a spatial filter to the plurality of LIDAR points to generate a set of filtered LIDAR points, the spatial filter configured to remove LIDAR points outside a radius from the vehicle using a range estimate of each respective lidar point.

7. The system of claim 6, the operations further comprising:
   discretizing a ground plane into partially overlapping cells having a specified size;
   selecting, from the set of filtered LIDAR points, a set of candidate ground points associated with a first cell of the partially overlapping cells, the set of candidate ground points being selected based at least in part on height estimates for the set of filtered LIDAR points and an expected ground height within a specified lidar range,
   for each candidate ground point of the set of candidate ground points, performing a plane fitting to determine which candidate ground points belong to the ground plane within a threshold; and
   assigning the candidate ground points belonging to the ground plane to respective XY cell grid positions in the ground plane.

8. The system of claim 7, further comprising retaining candidate ground points that fit into the ground plane with normal pointing predominantly along a z-axis when the candidate ground points satisfy a minimum number of inliers per cell.

9. The system of claim 7, the estimating of the 6-degree-of-freedom pose comprising:
   aligning the first GIL image and the image prior at least in part by registering the assigned ground points with a 2.5D image prior using a registration algorithm comprising at least one of a Gauss-Newton framework or a Levenberg-Marquardt framework to generate the 6-degree-of-freedom pose, the 2.5D image prior comprising pixels that encode height from the ground and intensity return.

10. The system of claim 1, the estimating of the 6-degree-of-freedom pose comprising aligning the first GIL image and the image prior in scale-space.

11. The system of claim 1, the operations further comprising removing points with vanishing reflectance or vanishing height gradients prior to processing the two GIL images for alignment.

12. The system of claim 1, the operations further comprising aligning the first GIL image and the image prior at least in part by performing Inverse Compositional alignment of the first GIL image and the image prior.

13. A method for determining a pose of a vehicle, the method comprising:
   receiving, by at least one processor, ground intensity LIDAR data describing a first ground point, the ground intensity LIDAR data comprising first intensity data describing the first ground point and height data describing the first ground point;
   forming, by the at least one processor, a first Ground Intensity LIDAR (GIL) image comprising a plurality of pixels arranged on a two-dimensional grid, a first pixel of the plurality of pixels comprising: a height value for the first ground point, a height gradient value for the first ground point, an intensity value for the first ground point, and an intensity gradient value for the first ground point;
   estimating, by the at least one processor, a 6-degree-of-freedom pose that minimizes an error between the first GIL image and an image prior; and
   returning, by the at least one processor, the 6-degree-of-freedom pose as a pose estimate for the vehicle.

14. The method of claim 13, wherein the estimating of the 6-degree-of-freedom pose comprises aligning the first GIL image and the image prior using at least one of a Gauss-Newton framework or a Levenberg-Marquardt framework for solving a nonlinear optimization problem that generates the 6-degree-of-freedom pose.

15. The method of claim 13, further comprising receiving an initial estimate of vehicle pose parameters, the estimating of the 6-degree-of-freedom pose being based at least in part on the initial estimate of vehicle pose parameters.

16. The method of claim 13, wherein receiving the ground intensity LLDAR data comprises:
    receiving a 3D point cloud including intensity values and uncertainty estimates;
    receiving a pose initialization estimate; and
    combining the 3D point cloud and pose initialization estimate.

17. The method of claim 16, the 3D point cloud comprising a plurality of LIDAR points, further comprising:
    transforming each of the plurality of LIDAR points with the pose initialization estimate to bring the respective LIDAR points into a consistent coordinate system; and
    storing the transformed LIDAR points in a rolling buffer that accumulates LIDAR points over a period of time.

18. The method of claim 13, further comprising removing points with vanishing reflectance or vanishing height gradients prior to processing the two GIL images for alignment.

19. The method of claim 13, further comprising aligning the first GIL image and the image prior at least in part by performing Inverse Compositional alignment of the first GIL image and the image prior.

20. A non-transitory computer-readable medium comprising instructions thereon that when executed by at least one processor, because the at least one processor to perform operations comprising:
    receiving ground intensity LIDAR data describing a first ground point, the ground intensity LIDAR data comprising first intensity data describing the first ground point and height data describing the first ground point;
    forming a first GIL image comprising a plurality of pixels arranged on a two-dimensional grid, a first pixel of the plurality of pixels comprising: a height value for the first ground point, a height gradient value for the first ground point, an intensity value for the first ground point, and an intensity gradient value for the first ground point;
    estimating a 6-degree-of-freedom pose that minimizes an error between the first GIL image and an image prior; and
    returning the 6-degree-of-freedom pose as a pose estimate for a vehicle.

* * * * *